US012380399B2

(12) United States Patent
Raymond

(10) Patent No.: US 12,380,399 B2
(45) Date of Patent: Aug. 5, 2025

(54) SYSTEM AND METHOD OF AN EXPLANATION TOOL FOR AUTOMOTIVE PRODUCTION PLANNING

(71) Applicant: Blue Yonder Group, Inc., Scottsdale, AZ (US)

(72) Inventor: Vincent Raymond, Montréal (CA)

(73) Assignee: Blue Yonder Group, Inc., Scottsdale, AZ (US)

( * ) Notice: Subject to any disclaimer, the term of this patent is extended or adjusted under 35 U.S.C. 154(b) by 352 days.

(21) Appl. No.: 16/796,639

(22) Filed: Feb. 20, 2020

(65) Prior Publication Data

US 2020/0193366 A1    Jun. 18, 2020

Related U.S. Application Data

(63) Continuation of application No. 15/990,385, filed on May 25, 2018, now Pat. No. 10,614,414, which is a continuation-in-part of application No. 15/621,525, filed on Jun. 13, 2017, now Pat. No. 10,380,524.

(60) Provisional application No. 62/361,118, filed on Jul. 12, 2016.

(51) Int. Cl.
*G06Q 10/087* (2023.01)
*G06Q 10/0633* (2023.01)

(52) U.S. Cl.
CPC ....... *G06Q 10/087* (2013.01); *G06Q 10/0633* (2013.01)

(58) Field of Classification Search
CPC ...... G06Q 10/10; G06Q 10/06; G06Q 10/087; G06Q 50/04; G06Q 10/08; G06Q 40/04; G06Q 30/0603; G06Q 10/0637; G05B 19/41865; G05B 19/4063; G06F 16/248; G06F 16/338; G06F 16/26; G06F 16/957; G06F 3/0481
USPC .......... 700/36, 95, 100, 101, 107; 705/7.12, 705/7.22, 7.36, 341; 345/440; 706/46
See application file for complete search history.

(56) References Cited

U.S. PATENT DOCUMENTS

| | | | |
|---|---|---|---|
| 5,608,621 A | 3/1997 | Caveney et al. | |
| 7,251,539 B2 * | 7/2007 | Nishimoto | G06Q 10/06 700/106 |
| 7,584,078 B2 * | 9/2009 | Junghans | G06Q 10/06 703/1 |
| 8,069,326 B2 * | 11/2011 | Shimizu | G06F 3/067 711/158 |
| 8,190,465 B2 * | 5/2012 | Lokowandt | G06Q 10/06312 705/28 |

(Continued)

FOREIGN PATENT DOCUMENTS

| | | | | |
|---|---|---|---|---|
| EP | 0488246 A2 * | 6/1992 | ......... | G06B 19/417 |
| JP | 0488246 A2 * | 11/1991 | ....... | G05B 19/41865 |
| WO | WO-2014152396 A2 * | 9/2014 | ......... | G06Q 30/0603 |

*Primary Examiner* — Olusegun Goyea
(74) *Attorney, Agent, or Firm* — Spencer Fane LLP; Steven J. Laureanti

(57) ABSTRACT

A system and method are disclosed including a production planner that receives a sales forecast for configurations of an automobile. The production planner also receives constraints associated with an automobile supply chain. The production planner further models configurations and constraints as a production planning problem, solves a production plan for automobiles, and displays an automobile production solution of the production planning problem.

20 Claims, 11 Drawing Sheets

(56) References Cited

U.S. PATENT DOCUMENTS

| | | | |
|---|---|---|---|
| 8,326,447 B2* | 12/2012 | Sidner | G06Q 10/087 700/95 |
| 8,655,705 B2* | 2/2014 | Riepshoff | G06Q 10/087 705/348 |
| 8,666,516 B2* | 3/2014 | Sidner | G06Q 10/06 700/36 |
| 9,721,291 B1* | 8/2017 | Kennis | G06Q 30/0643 |
| 9,767,496 B2* | 9/2017 | Amato | G06Q 30/0283 |
| 2003/0069798 A1* | 4/2003 | Hoffman | G06Q 10/087 705/28 |
| 2003/0074281 A1* | 4/2003 | Hoffman | G06Q 10/06 705/28 |
| 2005/0108115 A1* | 5/2005 | Green | G06Q 10/087 705/28 |
| 2006/0173728 A1 | 8/2006 | An et al. | |
| 2007/0038893 A1* | 2/2007 | Junghans | G06F 30/00 714/30 |
| 2008/0255912 A1* | 10/2008 | Christiansen | G06Q 10/0631 705/7.12 |
| 2009/0138587 A1* | 5/2009 | Callaghan | G05B 19/4185 709/223 |
| 2010/0079460 A1* | 4/2010 | Breeds | G06F 16/26 345/440 |
| 2010/0079462 A1* | 4/2010 | Breeds | G06T 11/206 345/440 |
| 2010/0161364 A1* | 6/2010 | Lokowandt | G06Q 10/087 705/28 |
| 2010/0161365 A1* | 6/2010 | Lokowandt | G06Q 30/0601 705/28 |
| 2011/0270429 A1* | 11/2011 | Sidner | G06Q 50/04 700/100 |
| 2011/0282476 A1 | 11/2011 | Tegemier et al. | |
| 2012/0035973 A1* | 2/2012 | Bradford | G06Q 10/06312 705/7.22 |
| 2013/0060370 A1* | 3/2013 | Sidner | G06Q 10/06 700/99 |
| 2014/0031965 A1* | 1/2014 | Sun | G06Q 10/06 700/100 |
| 2015/0058270 A1* | 2/2015 | Kawata | G06Q 10/0637 706/46 |
| 2015/0066592 A1* | 3/2015 | Ehm | G06Q 30/0202 705/7.31 |
| 2015/0081077 A1* | 3/2015 | Li | G05B 19/41865 700/100 |
| 2015/0109287 A1* | 4/2015 | Grichnik | G06Q 10/067 345/589 |
| 2016/0055445 A1* | 2/2016 | Sessoms | G06Q 10/063114 705/2 |
| 2016/0210683 A1* | 7/2016 | Aqlan | G06Q 30/0635 |
| 2017/0293622 A1* | 10/2017 | Miller | G06F 16/24573 |
| 2017/0293685 A1* | 10/2017 | Miller | G06F 16/248 |
| 2017/0344920 A1* | 11/2017 | Shenoy | G06Q 10/0635 |

* cited by examiner

FIG. 5

| 500 | PERIOD 1 | PERIOD 2 | PERIOD 3 | PERIOD 4 | PERIOD 5 |
|---|---|---|---|---|---|
| DEMAND | 1000 | 900 | 1000 | 850 | 700 |
| STOCK MAX | 100 | 100 | 100 | 100 | 100 |
| STOCK MIN | 50 | 50 | 50 | 50 | 50 |
| INITIAL STOCK | 25 | 50 | 50 | 50 | 50 |
| PRODUCTION NEEDS MIN | 1025 | 900 | 1000 | 850 | 700 |
| PRODUCTION NEEDS MAX | 1075 | 950 | 1050 | 900 | 750 |
| PRODUCTION ANSWER | 1025 | 900 | 1000 | 850 | 600 |
| PRODUCTION TO SALES | 1000 | 900 | 1000 | 850 | 600 |
| STOCK RESULT | 50 | 50 | 50 | 50 | 50 |

FIG. 6

| 600 | PERIOD 1 | PERIOD 2 | PERIOD 3 | PERIOD 4 | PERIOD 5 |
|---|---|---|---|---|---|
| DEMAND | 1000 | 900 | 1000 | 850 | 700 |
| STOCK MAX | 100 | 100 | 100 | 100 | 100 |
| STOCK MIN | 50 | 50 | 50 | 50 | 50 |
| INITIAL STOCK | 25 | 50 | 50 | 50 | 50 |
| PRODUCTION NEEDS MIN | 1025 | 900 | 1000 | 850 | 700 |
| PRODUCTION NEEDS MAX | 1075 | 950 | 1050 | 900 | 750 |
| PRODUCTION ANSWER | 1025 | 900 | 1000 | 850 | 600 |
| PRODUCTION TO SALES | 1000 | 900 | 1000 | 850 | 600 |
| STOCK RESULT | 50 | 50 | 50 | 50 | 50 |

FIG. 7

| | PERIOD 1 | PERIOD 2 | PERIOD 3 | PERIOD 4 | PERIOD 5 |
|---|---|---|---|---|---|
| DEMAND | 1000 | 900 | 1000 | 850 | 700 |
| STOCK MAX | 100 | 100 | 100 | 100 | 100 |
| STOCK MIN | 50 | 50 | 50 | 50 | 50 |
| INITIAL STC | | | | | 50 |
| PRODUCTION NE | | | | | 700 |
| PRODUCTION NE | | | | | 750 |
| PRODUCTION A | | | | | 600 |
| PRODUCTION T( | | | | | 600 |
| STOCK RES | | | | | 50 |

OBJECTIVES: 720

| | |
|---|---|
| DEMAND | 100 |
| STOCK MAX | 1000 |
| STOCK MIN | 1000 |
| PLANT/MODEL PRODUCTION CAPACITY | 10000 |
| OPTION PRODUCTION CAPACITY | 100000 |

FIG. 8

| | PERIOD 1 | PERIOD 2 | PERIOD 3 | PERIOD 4 | PERIOD 5 |
|---|---|---|---|---|---|
| DEMAND | 1000 | 900 | 1000 | 850 | 700 |
| STOCK MAX | 100 | 100 | 100 | 100 | 100 |
| STOCK MIN | 50 | 50 | 50 | 50 | 50 |
| INITIAL STOCK | 25 | 50 | 50 | 50 | 50 |
| PRODUCTION NEEDS MIN | 1025 | 900 | 1000 | 850 | 700 |
| PRODUCTION NEEDS MAX | 1075 | 950 | 1050 | 900 | 750 |
| PRODUCTION ANSWER | 1025 | 900 | 1000 | 850 | 600 |
| PRODUCTION TO SALES | 1000 | 900 | 1000 | 850 | 650 |
| STOCK RESULT | 50 | 50 | 50 | 50 | 0 |

600 → (table)  710 → OBJECTIVES

|  | PERIOD 1 | PERIOD 2 | PERIOD 3 | PERIOD 4 | PERIOD 5 |
|---|---|---|---|---|---|
| DEMAND | 1000 | 900 | 1000 | 850 | 700 |
| STOCK MAX | 100 | 100 | 100 | 100 | 100 |
|  |  |  |  | 50 | 50 |
|  |  |  |  | 50 | 50 |
|  |  |  |  | 850 | 700 |
|  |  |  |  | 900 | 750 |
|  |  |  |  | 850 | 600 |
|  |  |  |  | 850 | 650 |
|  |  |  |  | 50 | 0 |

OPTION PRODUCTION CAPACITY RESULTS PERIOD 5:  1110

| | SUV | SEDAN | ELEC | CAPACITY |
|---|---|---|---|---|
| V6 3.0L | 400 | 1050 | 0 | 1450 |
| 4 CYL. 2.0L | 200 | 900 | 0 | 1100 |
| AT | 200 | 900 | 0 | 1100 |
| MOONROOF | 100 | 200 | 25 | 325 |
| RADIO A24 | 300 | 1000 | 30 | 10000 |

600 → (table)  710 → OBJECTIVES

|  | PERIOD 1 | PERIOD 2 | PERIOD 3 | PERIOD 4 | PERIOD 5 |
|---|---|---|---|---|---|
| DEMAND | 1000 | 900 | 1000 | 850 | 700 |
| STOCK MAX | 100 | 100 | 100 | 100 | 100 |
|  |  |  |  | 50 | 50 |
|  |  |  |  | 50 | 50 |
|  |  |  |  | 850 | 700 |
|  |  |  |  | 900 | 750 |
|  |  |  |  | 850 | 600 |
|  |  |  |  | 850 | 650 |
|  |  |  |  | 50 | 0 |

525

OPTION PRODUCTION CAPACITY RESULTS ACTIVE CONSTRAINT GROUPS FOR SUV, PERIOD 5:  1110

| | SUV | SEDAN | ELEC | CAPACITY |
|---|---|---|---|---|
| V6 3.0L | 400 | 1050 | 0 | 1450 |
| 4 CYL. 2.0L | 200 | 900 | 0 | 1100 |
| AT | 200 | 900 | 0 | 1100 |

FIG. 12

|  | PERIOD 1 | PERIOD 2 | PERIOD 3 | PERIOD 4 | PERIOD 5 |
|---|---|---|---|---|---|
| DEMAND | 1500 | 900 | 1000 | 2000 | 2000 |
| STOCK MAX | 100 | 100 | 100 | 100 | 100 |
| STOCK MIN | 50 | 50 | 50 | 50 | 50 |
| INITIAL STOCK | 25 | 50 | 50 | 50 | 100 |
| PRODUCTION NEEDS MIN | 1525 | 900 | 1000 | 2000 | 1950 |
| PRODUCTION NEEDS MAX | 1575 | 950 | 1050 | 2050 | 2100 |
| PRODUCTION ANSWER | 1525 | 900 | 1000 | 2050 | 1950 |
| PRODUCTION TO SALES | 1500 | 900 | 1000 | 2000 | 2000 |
| STOCK RESULT | 50 | 50 | 50 | 100 | 50 |

FIG. 13

|  | PERIOD 1 | PERIOD 2 | PERIOD 3 | PERIOD 4 | PERIOD 5 |
|---|---|---|---|---|---|
| DEMAND | 1500 | 900 | 1000 | 2000 | 2000 |
| STOCK MAX | 100 | 100 | 100 | 100 | 100 |
| STOCK MIN | 50 | 50 | 50 | 50 | 50 |
| INITIAL STOCK | 25 | 50 | 50 | 50 | 100 |
| PRODUCTION NEEDS MIN | 1525 | 900 | 1000 | 2000 | 1950 |
| PRODUCTION NEEDS MAX | 1575 | 950 | 1050 | 2050 | 2100 |
| PRODUCTION ANSWER | 1525 | 900 | 1000 | 2050 | 1950 |
| PRODUCTION TO SALES | 1500 | 900 | 1000 | 2000 | 2000 |
| STOCK RESULT | 50 | 50 | 50 | 100 | 50 |

|  | PERIOD 1 | PERIOD 2 | PERIOD 3 | PERIOD 4 | PERIOD 5 |
|---|---|---|---|---|---|
| DEMAND | 1500 | 900 | 1000 | 2000 | 2000 |
| STOCK MAX | 100 | 100 | 100 | 100 | 100 |
| STOCK MIN | 50 | 50 | 50 | 50 | 50 |
| INITIAL STO... |  |  |  |  | 100 |
| PRODUCTION NE... |  |  |  |  | 1950 |
| PRODUCTION NE... |  |  |  |  | 2100 |
| PRODUCTION A... |  |  |  |  | 1950 |
| PRODUCTION T... |  |  |  |  | 2000 |
| STOCK RES... |  |  |  |  | 50 |

OBJECTIVES: 1340

| | |
|---|---|
| DEMAND | 100 |
| STOCK MAX | 1000 |
| STOCK MIN | 10 |
| PLANT/MODEL PRODUCTION CAPACITY | 10000 |
| OPTION PRODUCTION CAPACITY | 100000 |

FIG. 16

|  | PERIOD 1 | PERIOD 2 | PERIOD 3 | PERIOD 4 | PERIOD 5 |
|---|---|---|---|---|---|
| DEMAND | 1500 | 900 | 1000 | 2000 | 2000 |
| STOCK MAX | 100 | 100 | 100 | 100 | 100 |
| STOCK MIN | 50 | 50 | 50 | 50 | 50 |
| INITIAL STOCK | 25 | 50 | 50 | 50 | 200 |
| PRODUCTION NEEDS MIN | 1525 | 900 | 1000 | 2000 | 1850 |
| PRODUCTION NEEDS MAX | 1575 | 950 | 1050 | 2050 | 1900 |
| PRODUCTION ANSWER | 1525 | 900 | 1000 | 2150 | 1850 |
| PRODUCTION TO SALES | 1500 | 900 | 1000 | 2000 | 2000 |
| STOCK RESULT | 50 | 50 | 50 | 200 | 50 |

|  | PERIOD 1 | PERIOD 2 | PERIOD 3 | PERIOD 4 | PERIOD 5 |
|---|---|---|---|---|---|
| DEMAND | 1000 | 900 | 1000 | 850 | 700 |
| STOCK MAX | 100 | 100 | 100 | 100 | 100 |
| STOCK MIN | 50 | 50 | 50 | 50 | 50 |
| INITIAL STOCK | 25 | 50 | 50 | 50 | 50 |
| PRODUCTION NEEDS MIN | 1025 | 900 | 1000 | 850 | 700 |
| PRODUCTION NEEDS MAX | 1075 | 950 | 1050 | 900 | 750 |
| PRODUCTION ANSWER | 1025 | 900 | 1000 | 850 | 700 |
| PRODUCTION TO SALES | 1000 | 900 | 1000 | 850 | 700 |
| STOCK RESULT | 50 | 50 | 50 | 50 | 50 |

FIG. 17

SYSTEM AND METHOD OF AN EXPLANATION TOOL FOR AUTOMOTIVE PRODUCTION PLANNING

CROSS-REFERENCE TO RELATED APPLICATIONS

This application is a continuation of U.S. patent application Ser. No. 15/990,385, filed on May 25, 2018 and entitled "System and Method of an Explanation Tool for Automotive Production Planning," which is a continuation-in-part of U.S. patent application Ser. No. 15/621,525, filed on Jun. 13, 2017, entitled "System and Method of Automotive Production Planning", now U.S. Pat. No. 10,380,524, which claims the benefit under 35 U.S.C. § 119(e) to U.S. Provisional Application No. 62/361,118, filed Jul. 12, 2016, and entitled "System and Method of Automotive Production Planning." The present disclosure is also related to that disclosed in, and claims the benefit under 35 U.S.C. § 119(e) to the U.S. Provisional Application No. 62/518,364, filed Jun. 12, 2017, entitled "Explanation Tool for Automotive Production Planning." U.S. patent application Ser. No. 15/990,385, U.S. Pat. No. 10,380,524 and U.S. Provisional Application Nos. 62/361,118 and 62/518,364 are assigned to the assignee of the present application. The subject matter disclosed in U.S. patent application Ser. No. 15/990,385, U.S. Pat. No. 10,380,524 and U.S. Provisional Application Nos. 62/361, 118 and 62/518,364 are hereby incorporated by reference into the present disclosure as if fully set forth herein.

TECHNICAL FIELD

The present disclosure relates generally to automotive production planning and specifically to a system and method for visualizing and explaining allocation of automobile configuration production in a multi-plant multi-market multi-period supply chain.

BACKGROUND

Automobiles (such as cars, trucks, and other types of motorized vehicles) are typically sold in various configurations. Each configuration can have hundreds or thousands of different options. For example, a car may be sold in different trims, such as a sport model, economy model, premium model, or the like. Each of the models may have a different type of engine, radio, upholstery, lighting, or other components. Some of the components may always be sold together in the same configuration while others may never be sold in the same configuration. The configurations of the many components of the typical automobile makes determining an automotive production plan difficult without any explanation of constraints. The complexity to determine automobile production with so many configurations and without an explanation of the various constraints is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 5 illustrates a graphical user interface of an exemplary automobile production solution, according to embodiments;

FIG. 6 illustrates a graphical user interface of an exemplary explanation tool window, according to an embodiment;

FIG. 7 illustrates a graphical user interface of explanation tool window 600 having an objectives display, according to an embodiment;

FIG. 8 illustrates an additional view of the graphical user interface of the exemplary explanation tool window, according to an embodiment;

FIG. 11 illustrates a graphical user interface of the explanation tool window having an option production capacity display, according to an embodiment;

FIG. 12 illustrates a graphical user interface of the explanation tool window having an option production capacity display, according to another embodiment;

FIG. 13 illustrates a graphical user interface of an exemplary automobile production solution having option capacity, according to embodiments;

FIG. 14 illustrates a graphical user interface of an exemplary automobile production solution having option capacity, according to an embodiment;

FIG. 15 illustrates a graphical user interface of an explanation tool window having objectives display, according to an embodiment;

FIG. 16 illustrates an additional view of the graphical user interface of an exemplary explanation tool window for a sedan model, according to an embodiment; and FIG. 17 illustrates an additional view of the graphical user interface of an exemplary explanation tool window for an SUV model, according to an embodiment.

DETAILED DESCRIPTION

Figure 1:
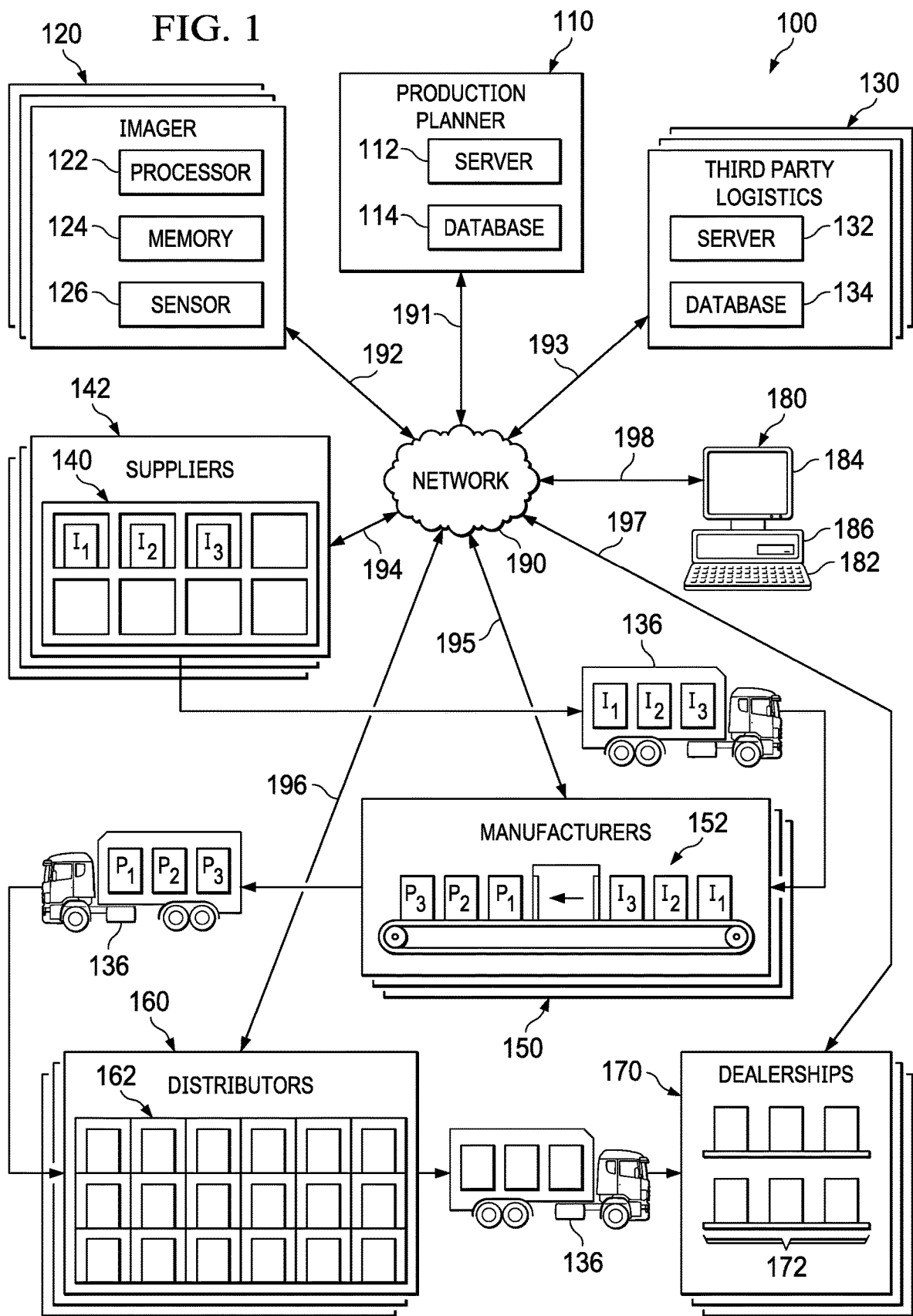
FIG. 1 illustrates an exemplary supply chain network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to an explanation tool that generates visualizations and explanation of constraints during automotive production planning. According to embodiments, the explanation tool comprises a graphical user interface that provides visualizations and explanations during automotive sales and operations planning. In addition, or as an alternative, the explanation tool displays information about the constraints that are related to the results of the production plan, which allows a user of the explanation tool to better understand the relationship between various constraints and objectives, and their impact on automotive planning solution results. According to embodiments, the explanation tool provides visualization and explanation of automotive planning solutions. The explanation tool provides context and explanation for constraints, option production capacity results, and active constraint groups.

In addition, or as an alternative, aspects of the following disclosure relate to production planning of automobile configurations in a multi-plant, multi-market and multi-period automobile supply chain network. Automobiles (such as cars, trucks, and other types of motorized vehicles) are typically sold with the presence or absence of various components substituted for one another. The presence, absence, or substitution of any components may be termed as an "option." A typical automobile may comprise hundreds or thousands of options, which may be sold as various combinations of options, or configurations. For example, a particular automobile model may be sold in various types of trim, such as a sports trim, economy trim, mid-range trim, premium trim, or the like. Examples of automobile models are sports utility vehicle (SUV), station wagon, sedan, coupe, hatchback, electric, and the like. Each of the automobile models may be associated with available options such as a specific type of engine (e.g. V8, V6, four cylinder), radio (e.g. AM/FM radio, satellite radio, touchscreen interface, navigation equipment), upholstery (e.g. fabric, leather, race-style seating), lighting (e.g. fog lamps, HID lights, LED lights, projector headlights), or other like options. Some of the options may be interdependent such that some options must always be included together, some options may never be included together, and some options may or may not be included in the same configuration.

In addition, selecting automobile configurations may be dependent on more than just the interdependency of options. Selecting such a configuration may be dependent on demand, capacity and other manufacturing and logistical constraints, lead time, supply chain disruption, lot sizes, and other factors. Such factors play a crucial role in configuration decisions such as adding or removing options from a configuration or whether to introduce a new configuration.

The automobile industry has used many techniques to optimize production planning of automobile configurations including just in time, build to order, and other techniques. However, with the market developments and new technologies, those techniques are inadequate. Embodiments of the current disclosure solve production planning for automobile configurations from a higher-level perspective. According to embodiments, production plans based, at least in part, on one or more models and high-level inputs of automobile, manufacturing plant, market, and period information.

FIG. 1 illustrates an exemplary supply chain network 100 according to a first embodiment. Supply chain network 100 comprises production planner 110, one or more imagers 120, third party logistics 130, automobile suppliers 140, automobile manufacturers 150, automobile distributors 160, automobile dealerships 170, computer 180, network 190, and communication links 191-198. Although a single production planner 110, one or more imagers 120, one or more third party logistics 130, one or more automobile suppliers 140, one or more automobile manufacturers 150, one or more automobile distributors 160, one or more automobile dealerships 170, a single computer 180, and a single network 190 are shown and described, embodiments contemplate any number of production planners, imagers, third party logistics, automobile suppliers, automobile manufacturers, automobile distributors, automobile dealerships, computers, and networks, according to particular needs.

In one embodiment, production planner 110 comprises server 112 and database 114. According to embodiments, production planner 110 receives a demand or production forecast for predefined automobile configurations and determines a quantity and configuration of automobiles to be produced. Production planning may comprise a holistic approach that considers many or all aspects of a production planning problem by modeling the production plan as, for example, a linear program. Production planner 110 may then determine a quantity and configuration of automobiles to be produced by which manufacturing plants, for which markets, at which time periods based on automobile supply chain constraints and possible automobile configurations.

Automobile supply chain constraints used in the production planning problem may include, for example, flow constraints (i.e. the number of automobiles entering a node equals the number of automobiles leaving a node, or the total of starting stock and production equals the total of sales and ending stock), manufacturing plant constraints (e.g. capacity, lead time, and diversity), supplier capacity constraints, and minimum and maximum stock constraints. Each automobile configuration may be represented in the production plan by a serial number, code, or other alphanumeric string representing one or more, or all, of the possible options for an automobile configuration.

One or more imagers 120 comprise one or more electronic devices that receive imaging information from one or more sensors 126 or from one or more databases in supply chain network 100. According to embodiments, one or more imagers 120 comprise one or more processors 122, memory 124, one or more sensors 126, and may include any suitable input device, output device, fixed or removable computer-readable storage media, or the like. According to embodiments, one or more imagers 120 identify items near the one or more sensors 126 and generate a mapping of the item in supply chain network 100. As explained in more detail below, one or more third party logistics 130, suppliers 140, manufacturers 150, distributors 160, and dealerships 170 use the mapping of an item to locate the item in the supply chain network 100. The location of the item is then used to coordinate the storage and transportation of items in supply chain network 100 to implement one or more plans generated by production planner 110. Plans may comprise one or more of a production plan, demand plan, option plan, sales and operation plan, and master plan, as described herein.

One or more imagers 120 may comprise a mobile handheld device such as, for example, a smartphone, a tablet computer, a wireless device, or the like. In addition, or as an alternative, one or more imagers 120 comprise one or more networked electronic devices configured to transmit item identity information to one or more databases as an item passes by or is scanned by one or more imagers 120. This may include, for example, a stationary scanner located at one or more third party logistics 130, suppliers 140, manufacturers 150, distributors 160, or dealerships 170 that identifies items as the items pass near the scanner, including in one or more transportation vehicles 136. One or more sensors 126 of one or more imagers 120 may comprise an imaging sensor, such as, a camera, scanner, electronic eye, photodiode, charged coupled device (CCD), or any other electronic or manual sensor that detects or identifies images of automobiles or automotive components or reads labels, barcodes, or the like coupled with automobiles or automotive components. In addition, or as an alternative, one or more sensors 126 may comprise a radio receiver and/or transmitter configured to read an electronic tag coupled with an automobile or automotive component, such as, for example, an RFID tag.

Third party logistics 130 comprises server 132 and database 134. According to embodiments, third party logistics 130 directs one or more transportation vehicles 136 to ship one or more items between one or more third party logistics 130, suppliers 140, manufacturers 150, distributors 160, or dealerships 170, based, at least in part, on the quantities of a production plan determined by production planner 110. Transportation vehicles 136 comprise, for example, any number of trucks, cars, vans, boats, airplanes, unmanned aerial vehicles (UAVs), cranes, robotic machinery, or the like, In addition to the production plan, the number of items shipped by transportation vehicles 136 in third party logistics 130 may also be based, at least in part, on the number of items currently in stock at one or more third party logistics 130, suppliers 140, manufacturers 150, distributors 160, or dealerships 170, the number of items currently in transit, forecasted demand, a supply chain disruption, and the like. According to embodiments, transportation vehicles 136 may be associated with one or more suppliers 140, manufacturers 150, distributors 160, or dealerships 170, or another supply chain entity, according to particular needs.

As shown in FIG. 1, supply chain network 100 operates on one or more computers 180 that are integral to or separate from the hardware and/or software that support production planner 110 and one or more imagers 120, third party logistics 130, suppliers 140, manufacturers 150, distributors 160, and dealerships 170. Supply chain network 100 comprising production planner 110 and one or more imagers 120, third party logistics 130, suppliers 140, manufacturers 150, distributors 160, and dealerships 170 may operate on one or more computers 180 that are integral to or separate from the hardware and/or software that support the production planner 110 and one or more imagers 120, third party logistics 130, suppliers 140, manufacturers 150, distributors 160, and dealerships 170. Computers 180 may include any suitable input device 182, such as a keypad, mouse, touch screen, microphone, or other device to input information. Output device 184 may convey information associated with the operation of supply chain network 100, including digital or analog data, visual information, or audio information.

Computer 180 may include fixed or removable computer-readable storage media, including a non-transitory computer readable medium, magnetic computer disks, flash drives, CD-ROM, in-memory device or other suitable media to receive output from and provide input to supply chain network 100. Computer 180 may include one or more processors 186 and associated memory to execute instructions and manipulate information according to the operation of supply chain network 100 and any of the methods described herein. In addition, or as an alternative, embodiments contemplate executing the instructions on computer 180 that cause computer 180 to perform functions of the method. Further examples may also include articles of manufacture including tangible computer-readable media that have computer-readable instructions encoded thereon, and the instructions may comprise instructions to perform functions of the methods described herein. According to some embodiments, the functions and methods described in connection with imager 120 may be emulated by one or more modules configured to perform the functions and methods as described.

Production planner 110 and one or more imagers 120, third party logistics 130, suppliers 140, manufacturers 150, distributors 160, and dealerships 170 may each operate on one or more separate computers, a network of one or more separate or collective computers, or may operate on one or more shared computers. In addition, supply chain network 100 may comprise a cloud based computing system having processing and storage devices at one or more locations, local to, or remote from production planner 110 and one or more imagers 120, third party logistics 130, suppliers 140, manufacturers 150, distributors 160, and dealerships 170. In addition, each of the one or more computers 180 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with production planner 110 and one or more imagers 120, third party logistics 130, suppliers 140, manufacturers 150, distributors 160, and dealerships 170. These one or more users may include, for example, a "manager" or a "planner" handling production planning and/or one or more related tasks within supply chain network 100. In addition, or as an alternative, these one or more users within supply chain network 100 may include, for example, one or more computers programmed to autonomously handle, among other things, production planning, demand planning, option planning, sales and operations planning, order placement, automated warehouse operations (including removing automobile components from and placing automobile components in inventory), robotic production machinery (including building or assembling automobiles or automobile components), and/or one or more related tasks within supply chain network 100.

One or more third party logistics 130, suppliers 140, manufacturers 150, distributors 160, and dealerships 170 represent one or more automotive supply chain entities in one or more supply chain networks 100, including one or more enterprises. One or more third party logistics 130 may be any suitable entity that provides warehousing and transportation for automobile or automotive components in the automobile supply chain. Third party logistics 130 may, for example, receive an automobile or automotive component from a supply chain entity in the supply chain network and store and transport the automobile or automotive component for another supply chain entity. One or more third party logistics 130 may comprise automated warehousing systems that automatically remove automobile components from and place automobile components into inventory based, at least in part, on a production plan, demand plan, option plan, sales and operation plan, or master plan determined by production planner 110. Automotive components may comprise, for example, components, materials, products, parts, items, or supplies that may be used to produce automobiles or other automotive components. In addition, or as an alternative, an automotive component may comprise a part of the automobile or a supply or resource that is used to manufacture the automobile, but does not become a part of the automobile.

One or more suppliers 140 may be any suitable entity that offers to sell or otherwise provides one or more automotive components to one or more automotive manufacturers 150. Suppliers 140 may comprise automated distribution systems 142 that automatically transport automobiles and automotive components to one or more automotive manufacturers 150 based, at least in part, on a production plan, demand plan, option plan, sales and operation plan, or master plan determined by production planner 110 and/or one or more other factors described herein.

Automobile manufacturer 150 may be any suitable entity that manufactures at least one automobile or automotive component. Manufacturer 150 may use one or more automotive components during the manufacturing process to manufacture, fabricate, assemble, or otherwise process an automobile or automotive component. An automobile or automotive component may be supplied to another automobile manufacturer 150, third party logistics 130, supplier 140, distributor 160, and/or dealership 170 in the automobile supply chain network 110. Automobile manufacturer 150 may, for example, produce and sell an automobile or automotive component to supplier 140, another manufacturer 150, a distributor 160, dealership, 170 a customer, or any other suitable person or entity. Such automobile manufacturers 150 may comprise automated robotic production machinery 152 that produces automobiles and automobile components based, at least in part, on a production plan, demand plan, option plan, sales and operation plan, or master plan determined by production planner 110.

Distributor 160 may be any suitable entity that offers to sell or otherwise distributes at least one automobile or automotive component to one or more dealerships 170 and/or customers. Distributors 160 may, for example, receive a product from a first automotive supply chain entity in supply chain network 100 and store and transport the product for a second automotive supply chain entity. Such distributors 160 may comprise automated warehousing systems 162 that automatically transport to one or more dealerships 170 or customers and/or automatically remove from or place into inventory automobiles and automobile components based, based, at least in part, on a production plan, demand plan, option plan, sales and operation plan, or master plan determined by production planner 110. One or more dealerships 170 may be any suitable entity that obtains one or more automobiles or automotive component to sell to one or more customers. In addition, one or more dealerships 170 may sell, store, and supply one or more automotive components and/or repair an automobile with one or more automotive components. One or more dealerships 170 may comprise any online or brick and mortar location, including locations with shelving systems 172. Shelving systems 172 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more dealerships 170 based on computer-generated instructions or automatically by machinery to place automobiles or automotive components in a desired location.

Although one or more third party logistics 130, suppliers 140, manufacturers 150, distributors 160, and dealerships 170 are shown and described as separate and distinct entities, the same entity may simultaneously act as any one or more third party logistics 130, suppliers 140, manufacturers 150, distributors 160, and dealerships 170. For example, one or more automobile manufacturers 150 acting as a manufacturer could produce an automobile or automotive component, and the same entity could act as a supplier to supply an automobile or automotive component to another automotive supply chain entity. Although one example of a supply chain network 100 is shown and described; embodiments contemplate any configuration of supply chain network 100, without departing from the scope of the present disclosure.

In one embodiment, production planner 110 may be coupled with network 190 using communications link 191, which may be any wireline, wireless, or other link suitable to support data communications between production planner 110 and network 190 during operation of supply chain network 100. One or more imagers 120 are coupled with network 190 using communications link 192, which may be any wireline, wireless, or other link suitable to support data communications between one or more imagers 120 and network 190 during operation of distributed supply chain network 100. Third party logistics 130 may be coupled with network 190 using communications link 193, which may be any wireline, wireless, or other link suitable to support data communications between third party logistics 130 and network 190 during operation of supply chain network 100.

One or more suppliers 140 may be coupled with network 190 using communications link 194, which may be any wireline, wireless, or other link suitable to support data communications between one or more suppliers 140 and network 190 during operation of supply chain network 100. One or more manufacturers 150 may be coupled with network 190 using communications link 195, which may be any wireline, wireless, or other link suitable to support data communications between one or more manufacturers 150 and network 190 during operation of supply chain network 100. One or more distributors 160 may be coupled with network 190 using communications link 196 which may be any wireline, wireless, or other link suitable to support data communications between one or more distributors 160 and network 190 during operation of supply chain network 100. One or more dealerships 170 may be coupled with network 190 using communications link 197, which may be any wireline, wireless, or other link suitable to support data communications between one or more dealerships 170 and network 190 during operation of supply chain network 100. Computer 180 may be coupled with network 190 using communications link 198, which may be any wireline, wireless, or other link suitable to support data communications between computer 180 and network 190 during operation of supply chain network 100.

Although communication links 191-198 are shown as generally coupling production planner 110 and one or more imagers 120, third party logistics 130, suppliers 140, manufacturers 150, distributors 160, dealerships 170, and computer 180 to network 190, each of production planner 110 and one or more imagers 120, third party logistics 130, suppliers 140, manufacturers 150, distributors 160, dealerships 170, and computer 180 may communicate directly with each other, according to particular needs.

In another embodiment, network 190 includes the Internet and any appropriate local area networks (LANs), metropolitan area networks (MANs), or wide area networks (WANs) coupling production planner 110 and one or more imagers 120, third party logistics 130, suppliers 140, manufacturers 150, distributors 160, dealerships 170, and computer 180. For example, data may be maintained by locally or externally of production planner 110 and one or more imagers 120, third party logistics 130, suppliers 140, manufacturers 150, distributors 160, dealerships 170, and computer 180 and made available to one or more associated users of production planner 110 and one or more imagers 120, third party logistics 130, suppliers 140, manufacturers 150, distributors 160, dealerships 170, and computer 180 using network 190 or in any other appropriate manner. For example, data may be maintained in a cloud database at one or more locations external to production planner 110 and one or more imagers 120, third party logistics 130, suppliers 140, manufacturers 150, distributors 160, dealerships 170, and computer 180 and made available to one or more associated users of production planner 110 and one or more imagers 120, third party logistics 130, suppliers 140, manufacturers 150, distributors 160, dealerships 170, and computer 180 using the cloud or in any other appropriate manner. Those skilled in the art will recognize that the complete structure and operation of network 190 and other components within supply chain network 100 are not depicted or described. Embodiments may be employed in conjunction with known communications networks and other components.

In accordance with the principles of embodiments described herein, production planner 110 and/or one or more automotive supply chain entities may generate one or more supply chain plans, including a production plan, a demand plan, an option plan, a sales and operation plan, and a master plan, and modify the supply chain based on the generated plans. For example, according to some embodiments, production planner 110 automatically places orders for automobile or automotive components at one or more suppliers 140, manufacturers 150, or distributors 160, initiates manufacturing of the automobile or automotive components at one or more manufacturers 150, and determines automobile or automotive components to be carried at one or more dealerships 170. Furthermore, production planner 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, and proportional or alternative sourcing of one or more third party logistics 130, suppliers 140, manufacturers 150, distributors 160, and dealerships 170 based on one or more generated plans and/or current inventory or production levels. For example, the methods described herein may include computers 180 receiving product data from automated machinery having at least one sensor and the product data corresponding to an item detected by the automated machinery. The received product data may include an image of the item, an identifier, as described above, and/or other product data associated with the automobile or automotive component (dimensions, texture, estimated weight, and any other like attributes). The method may further include computers 180 looking up the received product data in database 114 associated with production planner 110 to identify the item corresponding to the product data received from the automated machinery.

Computers 180 may also receive, from the automated machinery, a current location of the identified automobile or automotive component. Based on the identification of the automobile or automotive component, computers 180 may also identify (or alternatively generate) a first mapping in the database system, where the first mapping is associated with the current location of the identified automobile or automotive component. Computers 180 may also identify a second mapping in the database system, where the second mapping is associated with a past location of the identified automobile or automotive component. Computers 180 may also compare the first mapping and the second mapping to determine if the current location of the identified automobile or automotive component in the first mapping is different than the past location of the identified automobile or automotive component in the second mapping. Computers 180 may then send instructions to the automated machinery based, at least in part, on one or more differences between the first mapping and the second mapping such as, for example, to locate automobile or automotive component to add to or remove from an inventory of one or more third party logistics 130, suppliers 140, manufacturers 150, distributors 160, and dealerships 170.

Figure 2:
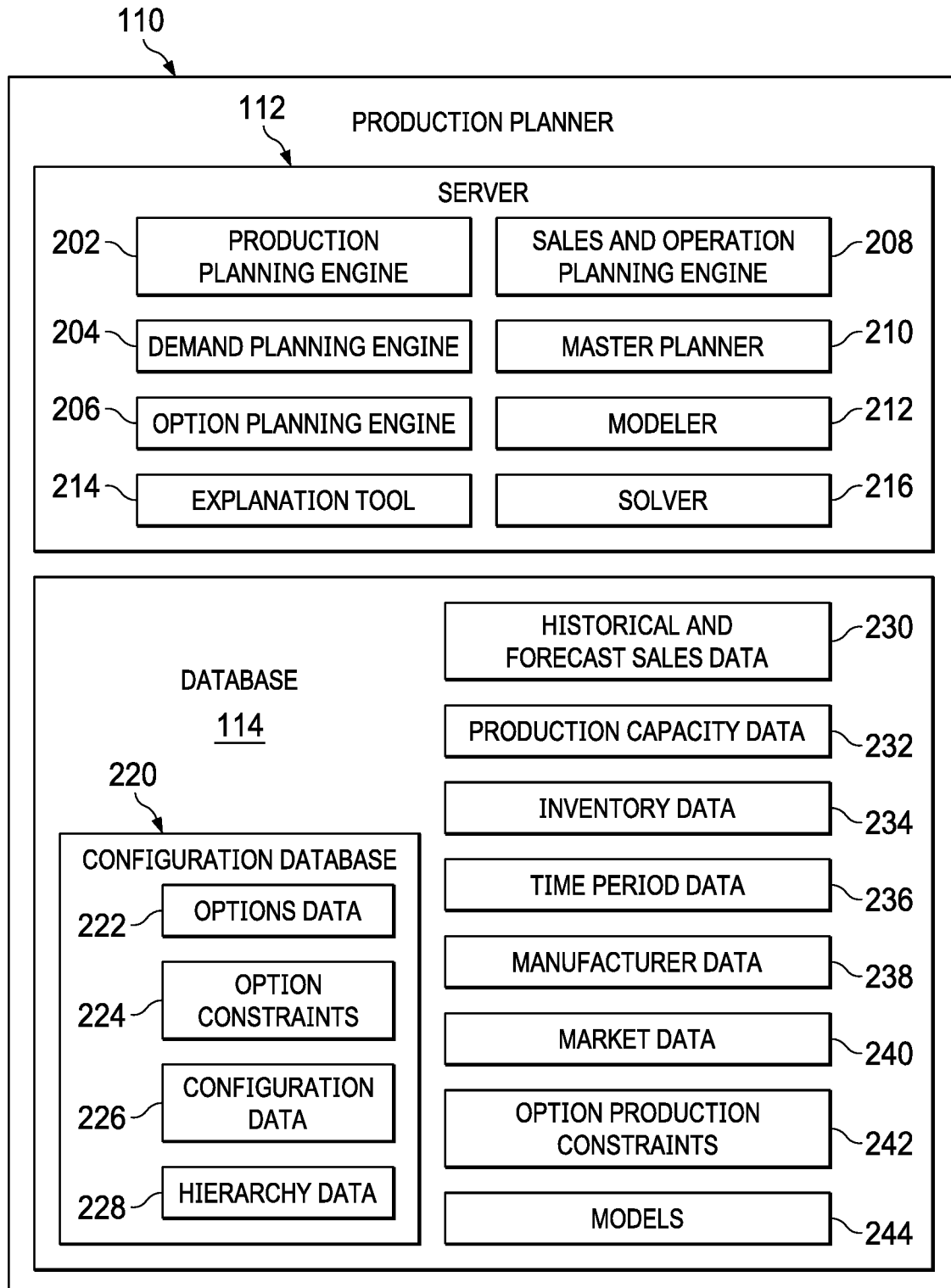
FIG. 2 illustrates the production planner of FIG. 1 in greater detail, in accordance with an embodiment.

FIG. 2 illustrates production planner 110 of FIG. 1 in greater detail, in accordance with an embodiment. As discussed above, production planner 110 may comprise server 112 and database 114. Although production planner 110 is shown and described as comprising a single server 112 and a single database 114, embodiments contemplate any suitable number of servers or databases internal to or externally coupled with production planner 110. In addition, or as an alternative, a production planner may be located internal or external to the one or more third party logistics 130, suppliers 140, manufacturers 150, distributors 160, and dealerships 170 according to particular needs.

According to embodiments, server 112 of production planner 110 comprises production planning engine 202, demand engine 204, option engine 206, sales and operations engine 208, master planner 210, modeler 212, explanation tool 214, and solver 216. In addition, database 114 of production planner 110 comprises a configuration database 220 (which comprises options data 222, option constraints 224, configuration data 226, and hierarchy data 228), historical and forecast sales data 230, production capacity data 232, inventory data 234, time period data 236, manufacturer data 238, market data 240, option production constraints 242, and models 244. Although particular engines, planners, modelers, solvers, and databases are shown and described, embodiments contemplate any suitable number or combination of engines, planners, modelers, solvers, and databases located at one or more locations, local to, or remote from, production planner 110, according to particular needs. Furthermore, the engines, planners, modelers, solvers, and databases may be located at one or more locations, local to or remote from, production planner 110 such as on multiple servers or computers at any location in supply chain network 100, such as networked among one or more third party logistics 130, suppliers 140, manufacturers 150, distributors 160, and dealerships 170.

Production planning engine 202 of server 112 may determine a production plan based, at least in part, on one or more constrained or unconstrained plans received from demand planning engine 204, option planning engine 206, and/or sales and operations planning engine 208. For example, production planner 110 may reconcile the option plan from option engine 206 according to the demand plan received from demand planning engine 204 and the sales and operations plan received from sales and operation engine 208, iteratively, to generate a production plan. In other words, production planner 110 may receive the demand plan, option plan, and sales and operations plan and refine each of the plans iteratively to generate a production plan.

Explanation tool 214 comprises a graphical user interface that provides visualization and explanation of automotive planning solutions. According to embodiments, explanation tool 214 provides context and explanation for constraints, option production capacity results, and active constraint groups by interfacing with one or more outputs of production planner 110 and displaying dynamic, context-specific graphics, text, numbers, and links on one or more computers 180, to provide interpretation and explanation of the underlying reasons for the outputs. According to an embodiment, explanation tool 214 utilizes outputs by a mathematical model and solver 216 and provides much-needed context and explanation for solver 216 results.

Solver 216 of production planner 110 comprises any tool to generate a solution to a production planning problem. According to embodiments, solver 216 may be a module of production planning engine 202. According to other embodiments, solver 216 may be a separate module configured to solve a production planning problem. According to embodiments, solver 216 provides numerical values for various variables of the production planning problem, but does not provide an explanation of the relationships between the values. However, embodiments of explanation tool 214 generate an explanation of the results provided by solver 210. As an example only and as discussed in more detail below, without explanation tool 214, production planner 110 may see a production result of 600 vehicles when 700 vehicles are needed. Explanation tool 214 may explain through various functions, windows, and features that, for the ABC market, a capacity is limiting production to 600. Explanation tool 214 may then indicate the capacity is the factor limiting production by highlighting the capacity result in a particular way to indicate the production is exactly the capacity, which readily indicates why production planner 110 cannot produce the 700 vehicles desired. According to embodiments, explanation tool 214 provides a faster process for production planner 110 and reduces computational processing time of one or more computers 180 to determine why solver 216 produced a result that does not match the production planner's needs.

According to embodiments, production planner 110 generates a production plan based, at least in part, on automobile configurations (including predefined vehicle configurations, which may be referred to as "predefined automobiles"), historical and forecast sales data 230, production capacity data 232, inventory data 234, time period data 235, manufacturer data 238, market data 240, option production constraints 242, and any other constraints in accordance with one or more models 244. The predefined automobiles may comprise, for example, a list of automobile configurations which may include a demand associated with particular options, configurations, or fully defined vehicles (FDV), as described in more detail below. Historical and forecast sales data 230 may comprise, for example, past and projected demand of sales organized according to any particular criteria, including automobile models, automobile options, automobile configurations, components, automobiles, markets, periods, and the like.

Production capacity data 232 may comprise data establishing the minimum and maximum capacity for production of one or more manufacturers 150 for automobile or automobile components over a given time period and may be associated with a lead time. Inventory data 234 may comprise the minimum and maximum number of automobiles models or automobile components that may be stored at various stocking points in the supply chain as well as the current or projected stock at each stocking point. According to embodiments, production planning engine 202 receives and transmits inventory data 234, including item identifiers, pricing data, attribute data, inventory levels, and other like data about one or more automobiles or automotive components between one or more locations in the supply chain network 100 including among one or more third party logistics 130, suppliers 140, manufacturers 150, distributors 160, and dealerships 170.

Time period data 236 may comprise, for example, any suitable time information, such as a planning period of weeks, months, days, years, quarter, or any other suitable time period over which one or more plan is determined. Importantly, time period information may be especially critical to the functionality of production planner 110 where a production planner may need to consider inputs over a long time period, such as, for example, between one and two years, or longer. Manufacturer data 238 may comprise data relating to the manufacturing plants for automobile or automobile components such as the markets served by each manufacturer 150, the distribution chains for each manufacturer 150, and the types of automobile and automobile components that may be manufactured at each manufacturer 150. Market data 240 may comprise data delineating the regions (geographic, economic, or otherwise) that are used to model distribution of automobile or automobile components.

Manufacturer data 238 and market data 240 may comprise, for example, the number, type, and location of automobile manufacturers 150 and the markets that those manufacturers 150 serve. For example, manufacturers 150 may be associated with a particular region where the manufacturer 150 operates, such as, the United States, Canada, Mexico, Europe, or any other geographical region, such as a state, country, or continent. Similarly, markets may be divided into any desired geographical region, such as by state, country, continent, or any other region. Markets may comprise, for example, the Americas, Europe, and Asia, or markets may comprise the United States, Mexico, and Canada. Any other combination of manufacturing plant and market information may be organized into any desired region, according to particular needs. Option production constraints 242 are related to the capability of the manufacturers 150 to produce options and may comprise production constraints such as, for example, production capacity for particular options. Demand planning engine 204 of server 112 may receive historical and forecast sales data 230, such as, for example, past and projected demand data and marketplace data from dealerships 170 and determine a demand plan, based, at least in part, on the received data.

Option planning engine 206 of server 112 may determine an option plan by associating constraints with options of automobile option packages according to options and configurations stored in configuration database 220. Options data 222 of configuration database 220 may comprise data identifying available options associated with the make and models of automobiles. Each option may be associated with a particular automobile or one or more options may be associated with one or more automobiles, according to particular needs. The options may comprise selectable or configurable features, components, or configurations of automobiles. For example, options may comprise selection of an engine, transmission, wheels, color, seats, head lamps, quality of materials (such as interior or exterior finish options), brakes, tires, intake, exhaust, spoiler, or other components or systems of an automobile. The options may comprise the absence or presence of any automotive component (such as, for example, having a spoiler or not having a spoiler) or may represent a particular configuration of any automotive component (such as, for example, having a V8 engine versus a 4-cylinder engine). The options may comprise a particular version or part number of a selected automotive component, which may vary based on geographical location, safety requirements, ruggedness, value (such as, for example, a premium versus an economy model), or like considerations.

One or more of the options may have relationships that define various combinations and permutations of options in a finished automobile and/or an automotive component. These relationships may be defined by option constraints 224 of configuration database 220. Option constraints 224 comprise limits and permissions for relationships between options, such as limits to which options may occur together in a configuration and which options may not occur together in a configuration. Option constraints 224 may require that certain options are always found in an automobile together, are never found in an automobile together, are dependent or independent of other options, must be found in specific ratios in the automobile, and other like rules and constraints. For example, option constraints 224 may include, for example, that "premium leather seating is only available with V-8 engine." Therefore, any option for premium leather seating would be allowed only if the option for V-8 engine also occurred in the same configuration. Embodiments contemplate any suitable option constraints 224, according to particular needs. Option planning engine 206 may use options constraints 224 to refine the demand plan of the demand planning engine, such that, the demand for options is compatible with supply chain constraints, such as, for example, option production constraints 244.

In addition, options constraints 224 may be assigned to options according to a hierarchy stored in hierarchy data 228. Hierarchy data 228 may comprise a priority associated with each option such that options with a higher priority are assigned to an automobile prior to an option with a lower priority. For example, a demand target for an option for a V8 engine may have a higher priority than a demand target for an option to include leather seats. If, for example, the demand for the V8 engine was 100 vehicles and for leather seats was 80 vehicles, and all vehicles with a V8 engine must also have leather seats, then, the demand for V8 engines will have a higher priority than the demand for leather seats. Accordingly, the production planner 110 may determine that the production targets would be 100 vehicles with both the V8 engine option and the leather seats option.

Each combination or permutation of automobile options may be termed a configuration stored as configuration data 226. A configuration may comprise any collection of one or more automobile options, such as particular lighting systems, engines, model type, wheels, or any component or part of an automobile that may be configured, including permitted and disallowed configurations of each automobile.

Sales and operations planning engine 208 of server 112 may determine a sales and operations plan based, at least in part, on option production constraints 242. According to embodiments, sales and operations planning engine 208 receives option production constraints 242 such as, for example, constraints covering production limits on select options. For example, production limits may be maximum supply available per a defined time horizon that is available to meet a particular demand volume. Embodiments contemplate that option production constraints 242 are defined by a combination of logical operators.

According to embodiments, demand planning engine 204 and option planning engine 206 determine an unconstrained demand plan and option plan. In one embodiment, sales and operations planning engine 208 receives an unconstrained demand and option plan as an input and then constrains the plan based on production limits and option compatibility. In addition, or as an alternative, the output of the sales and operations plan may comprise a constrained demand and option plan which may not equal the unconstrained plan. In addition, the sales and operations plan may be visible and applicable to all parts of supply chain network 100.

After the demand plan, option plan, and sales and operations plan are determined and production planning engine 202 generates a production plan, master planner 210 of server 112 may generate a master plan and communicate the master plan to one or more third party logistics 130, suppliers 140, manufacturers 150, distributors 160, and dealerships 170 to produce automobiles or automotive components according to the refined master plan. As an example only and not by way of limitation, master planner 120 may place orders with one or more third party logistics 130, suppliers 140, manufacturers 150, and distributors 160 to produce or ship automobile and automotive components according to the master plan and may communicate to dealerships 170 the quantity and options of automobiles and automotive components that will be produced and the date that the automobiles and automotive components will arrive at dealerships 170.

According to embodiments, the level of granularity in the master plan is different than the production plan. Master planning may comprise, for example, a buffer of an amount of material and an operation that processes or transforms the material into an item with a set quantity. Embodiments of production planner 110 determine a production plan comprising a higher level of granularity than master planning. After the one or more inputs described above are received by production planner 110, modeler 212 of production planner 110 may determine a production plan utilizing one or more models 244. Models 244 of the database may comprise any suitable model of an automobile supply chain. According to some embodiments, the models comprise a network model comprising nodes and arcs where nodes represent manufacturers 150, automobile configurations, and markets and arcs represent the movement of automobile stock, as described in more detail below. According to other embodiments, models 244 comprise a mixed integer linear programming MIP model.

Models 244 may include one or more constraints. For example, models 244 may include one or more sales forecast constraints, production capacity constraints, supplier and production capacity constraints for option definition sets, and the like. A sales forecast constraint may comprise requiring that the inventory at the end of the previous planning period plus the production during the current planning period minus the inventory at the end of the current planning equals the sales forecast for the current planning period. The sales from a specific period may be shuffled to obtain what remains in stock so that the equation may be represented by the previous stock added to what is produced and subtracting what is sold is equal to the new stock for a given period. Production capacity constraints may comprise limiting the number of vehicles of a vehicle model (sedan or SUV for example) produced at a manufacturer 150 by the capacity of each plant of the manufacturer 150. Production capacity constraints are defined for each manufacturing plant, each period, and each vehicle model. Supplier and production capacity constraints may be defined for option definition sets (ODS) and for each period. Each of the constraints in models 244 may be defined by ODS and time period. An ODS represents a particular automobile sub-configuration (for instance, a black sedan with a V8).

Figure 3:
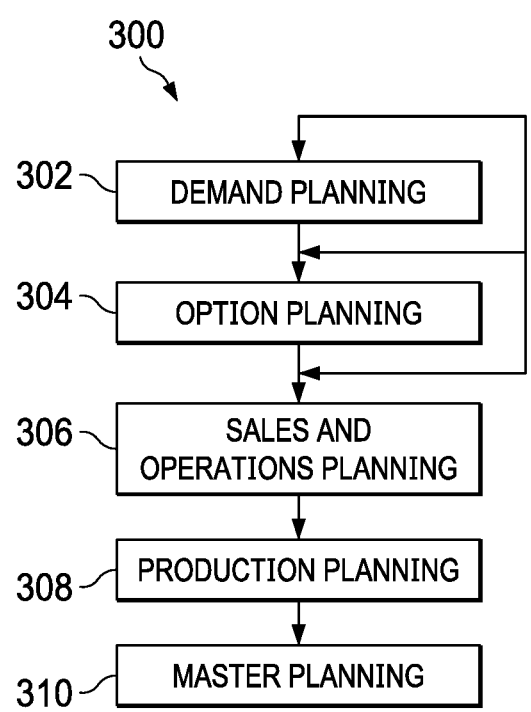
FIG. 3 illustrates an exemplary method of automobile configuration planning according to an embodiment.

FIG. 3 illustrates an exemplary method 300 of automobile configuration planning according to an embodiment. Although automobile configuration planning is depicted as a linear process, one or more actions may be performed in any order, combination, or repetitions to perform automobile configuration planning. For example, demand planning 302, option planning 304, and sales and operations planning 306 may comprise iterative processes that are performed multiple times in various orders, such that the demand plan, the option plan, and sales and operations plan inform and refine each other according to historical and forecast sales data 230, production capacity data 232, inventory data 234, time period data 236, manufacturer data 238, market data 240, models 232, option production constraints 244, options data 222, options constraints 224, configuration data 226, and hierarchy data 228. However, during demand planning 302, option planning 304, and sales and operations planning 306, the determined plans generally have few initial constraints, which helps generate plans directed to what the automobile manufacturer 150 would like to build, not necessarily what they are able to build. As the planning proceeds through further actions, more constraints are added or removed to further align a desired plan with a feasible plan.

At action 302, demand planning engine 204 generates a demand plan from a global consolidated view of market demand and production requirements. Demand planning engine 204 may receive historical and forecast sales data 230, option production constraints 244, and the like and generate a demand plan, which may include projected demand for one or more automobiles and automotive components. A demand plan may include a preliminary assessment of data received from dealerships 170, such as, for example, demand for types and quantities of automobiles and automotive components. Production planner 110 may communicate the generated demand plan to the option planning engine 206 and sales and operations planning engine 208.

At action 304, option planning engine 206 may determine the take rates and volumes of automobiles and automotive components at the option level. Option planning engine 206 may refine the demand plan according to the mix or the interaction between available automobile options. After action 304, production planner 110 may return to action 302 and iteratively refine the demand plan according to the option plan, such as analyzing the available options and returning to the demand plan to alter take rate percentages. In addition, or in the alternative, production planner 110 may continue to action 306. At action 306, sales and operations planning engine 208 may generate a sales and operation plan optimized to fulfill market demand and generate forecast orders. For example, sales and operations planning engine 208 may refine the option plan according to production capacity data 232, incrementally, so that, for example, a sales and operation plan is substantially refined according to the demand plan.

At action 308, production planning engine 202 communicates with third party logistics 130, suppliers 140, manufacturers 150, distributors 160, dealerships 170 and/or other automotive supply chain entities to generate a production plan that is optimized based on market demand while respecting constraints according to models 244. The production plan may determine, for example, which automobiles are to be produced for particular markets, at which manufacturers 150, for each of one or more time periods. The production plan may be based on overall sales forecasts and respects supplier 140 and manufacturer 150 production capacity constraints. After the one or more inputs described above are received by production planner 110, modeler 212 of production planner 110 may determine a production plan utilizing one or more models 244 as described below.

At action 310, master planner 210 generates a master plan for production of automobiles and automobile components. For example, master planner 210 may generate a master plan that determines which automobiles and automotive components will be produced during a specific time period or planning horizon, and the order or priority of the automobiles and automotive components produced. As discussed herein, production planning engine 202 generates a production plan that is optimized based on market demand while respecting constraints according to MIP models 244.

According to embodiments, inputs for models 244 may comprise predefined vehicle inputs, which may include, a model and its options, such as an SUV model with a V8 and B22 radio options; multi-plant and multi-market inputs, such as Plant A, B, C and markets, such as USA, Canada and Mexico; capacity inputs such as option capacity with the supplier or a vehicle spoiler; plant production constraint inputs, such as lead time constraints, minimum/maximum stock constraints, initial stock constraints; and demand inputs which may be input to satisfy the forecast so the demand for each model for each market for each time period. Moreover, time period inputs may include, for example, a plan period of a month, quarter, year or multiple years to solve the production planning. Although particular exemplary plan inputs into models 244 have been described, embodiments contemplate any number of plan inputs, according to particular needs.

In addition, or as an alternative, the output of models 244 may be used as input for explanation tool 214 to display information about the constraints that are related to the results of the production plan, which allows users of explanation tool 214 to better understand the relationship between various constraints and objectives, and their impact on automotive planning solution results. According to embodiments, explanation tool 214 provides visualization and explanation of automotive planning solutions. To further explain explanation tool 214, the following examples provides context and explanation for constraints, option production capacity results, and active constraint groups.

Figure 4:
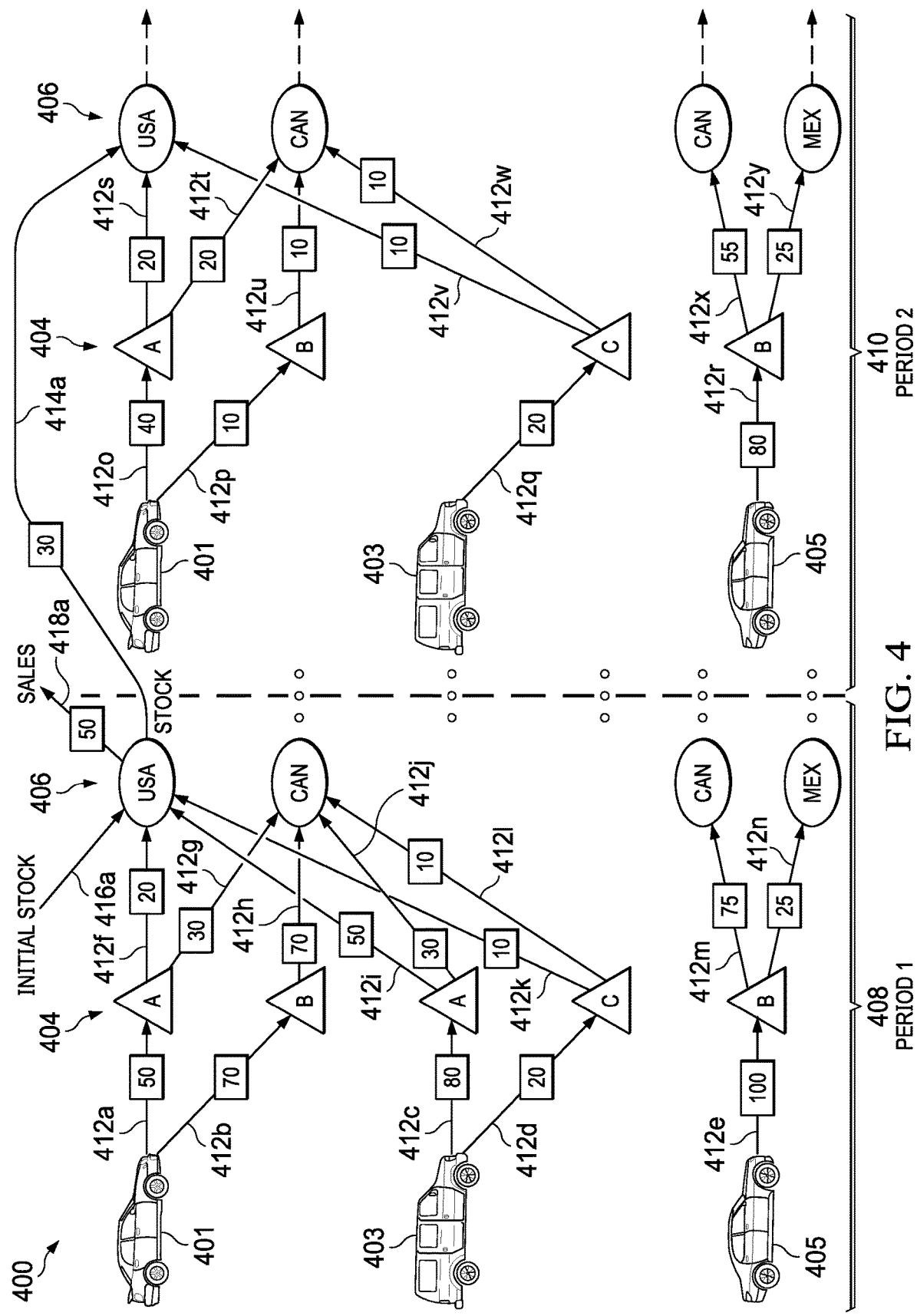
FIG. 4 illustrates a graphical representation of a network model showing the outputs of an exemplary production plan, according to an embodiment.

FIG. 4 illustrates a graphical representation of a network model 400 showing the outputs of an exemplary production plan, according to an embodiment. Network model 400 represents an exemplary flow of production of three automobile models with three configurations with various constraints indicated and represents one or more relationships between variables and constraints using nodes and arrows. A first automobile configuration 401 is a sedan model with a spoiler, the second automobile configuration 403 is a sedan model with upgraded wheels, and the third vehicle configuration 405 is a hatchback model. The triangles represent automobile manufacturing plants 404 (in this example three manufacturing plants, A, B and C), the ellipses represent destination markets 406 (in this example three destination markets USA, Canada and Mexico), and the arrows 412a-412y connecting the automobile configurations 401, 403, and 405, manufacturing plants 404, and markets 406 represent the allocation of automobiles among the various manufacturing plants 404 and markets 406. The tree chart is also divided into two periods, a first period 408 (Period 1) on the left side, and a second period 410 (Period 2) on the right side.

During the first period 408, Period 1, the arrow 412a connecting the first automobile configuration 401 (sedan model with spoiler) to Plant A represents that Plant A will produce 50 automobiles of the first configuration. The arrow 412b connecting the first automobile configuration 401 to Plant B represents that Plant B will produce 70 automobiles of the first configuration. Similarly, Plant A will produce 80 automobiles of the second configuration 403 (sedan model with upgraded wheels) and Plant C will produce 20 automobiles of the second configuration 403. Also, Plant B will produce 100 automobiles of the third configuration 405 (hatchback).

The arrows 412*f*-412*n* connecting manufacturing plants 404 to markets 406 represent the automobile configurations shipped from those manufacturing plants to the markets indicated. For example, the uppermost arrow 412*f* connecting Plant A to the USA market indicates that 20 automobiles of the first configuration 401 will be shipped from Plant A to the USA market. Similarly, the network model 400 indicates that 30 automobiles of the first configuration 401 will be shipped from Plant A to the Canadian market. Continuing with the example, Plant B will produce 70 automobiles of the first configuration 401 for the Canadian market and no automobiles of the first configuration 401 for the USA market. Plant A will also produce 50 automobiles of the second configuration 403 for the USA market and 30 vehicles for the Canadian market. Plant C will produce 10 automobiles of the second configuration 403 for the USA market and also produce 10 automobiles for the Canadian market. Finally, Plant B will produce 75 automobiles of the third configuration 405 for the Canadian market and 25 automobiles for the Mexican market.

Also, some amount of initial stock may be present in Period 1 for the USA market for the first automobile configuration. This is indicated by "Initial Stock" and an arrow 416*a* pointing at the USA market for the first automobile configuration 401. The network model 400 indicates that 50 automobiles were sold from this first time period by arrow 418*a,* and the arrow 414*a* from the USA ellipse in Period 1 to the USA ellipse in Period 2 represents unsold stock (30 automobiles) that is carried over from Period 1 408 to Period 2 410.

For Period 2, a similar production plan is determined based on the automobile configurations 401, 403, and 405, manufacturing plants 404, and the destination markets 406, and including any unsold stock from Period 1. For example, in the second period 410, Period 2, 40 automobiles of the first automobile configuration 401 will be produced by Plant A and 10 automobiles of the first automobile configuration 401 will be produced by Plant B. Plant C will produce 20 automobiles of the second configuration 403, and Place B will produce 80 automobiles of the third configuration. 405. Similar to Period 1, production planner will determine automobile allocation from each manufacturing plant 404 to different destination markets 406 based on particular automobile configurations 401, 403, and 405. For example, 20 automobiles of the first configuration 401 will be shipped from Plant A to the USA, and 20 automobiles of the first configuration will be shipped from Plant A to the Canadian market. The allocation of the remaining automobiles is indicated. After all constraints are input into the model, production planner 110 may determine a production plan using a MIP model and comprising the number of automobiles to produce at particular plants shipped to particular regions during particular time periods.

According to embodiments, the outputs for a production plan, of the exemplary network model 400, may comprise, for example, stock and sales for a specific plant in a specific market for a specific period, which may then be used by explanation tool 214 to refine the sales and operations plan. According to an embodiment, production planner 110 comprises solver 216 that solves the production planning problem and generates a solution comprising, for example, sales and production numbers. For example, the solution may indicate that 20 sedans with a spoiler should be produced at Plant A for the USA market in Period 1. In addition, or as an alternative, production planning engine 202 may select a particular vehicle to produce. As an example only and not by way of limitation, once the vehicle is selected, solver 216 may indicate a solution comprising a production of 50 sedans with a spoiler at Plant A where 20 vehicles will go to the USA market and 30 vehicles will go to the Canadian market at a first period. As another example, solver 216 may indicate a solution comprising a production of 80 sedans with upgraded wheels at Plant A and 20 sedans with upgraded wheels at Plant C where 60 vehicles will go to the USA market and 40 vehicles will go to the Canadian market at a first period. As yet another example, solver 216 may indicate a solution comprising a production of 80 hatchbacks at Plant B where 55 vehicles will go to the Canadian market and 25 vehicles will go to the Mexican market at a second period. According to embodiments, these numbers may be seen in sales and operations planning engine 208. Although particular outputs have been described, embodiments contemplate any number of outputs, according to particular needs.

In addition, or as an alternative, although, network model 400 illustrated in FIG. 4 is shown and described as being divided into two periods, a first period 408 (Period 1), and a second period 410 (Period 2), however, embodiments contemplate any number of time periods, according to particular needs. As an example only and not by way of limitation, and as shown in the below examples, the time periods for demand, stock maximum, stock minimum, initial stock, production needs minimum, production needs maximum, production answer, production to sales and stock result may be five time periods.

The following examples illustrate exemplary graphical user interfaces of exemplary production solutions and explanation tool windows having objectives displays, constraints displays and option production capacity displays according to an embodiment using network model 400 of the production plan.

FIG. 5 illustrates a graphical user interface of an exemplary automobile production solution 500, according to embodiments. According to embodiments, production planner 110 displays automobile production solution 500 in a table format, having rows 510 and columns 520, wherein the intersection of a particular row 510 and a particular column 520 is a cell. For example, period 5 525 has a demand 511 of 700, a stock maximum 512 of 100, a stock minimum 513 of 50, an initial stock 514 of 50, a production needs minimum 515 of 700, a production needs maximum 516 of 750, a production answer 517 of 600, a production to sales 518 of 600 and a stock result 519 of 50. Although particular rows 510, columns 520 and values in the individual cells are shown and described in the automobile production solution for periods 1-5 521-525, embodiments contemplate any number of rows, columns, values and time periods, according to particular needs.

To further explain the visualizing and explaining allocation of automobile configuration production in a multi-plant, multi-market, and multi-period supply chain, an example is now given. In the following example, period 5 525 illustrates the minimum amount of production of the sedan model with spoiler needed to meet production requirements 515 (Production Needs Min), is 700 vehicles. However, solver 216 has generated a solution for the production planning problem that has only 600 vehicles being produced 517 (Production Answer) in period 5 525, without any explanation as to why a particular value was chosen for this solution. For example, a user of production planner 110 may inquire why the production of, for example, the sedan model with spoiler to the USA market at period 5 525 is 100 vehicles short of the production requirements 515 (Production Needs Min). The solution provided by solver 216 does not explain why production planner 110 will not produce as many vehicles as needed. In other words, automobile production solution 500 may not be a good solution because 700 vehicles were expected to be produced, while the solution only provides for producing 600 vehicles. According to embodiments, and as discussed in more detail below, explanation tool 214 provides a graphical user interface that displays information and explanations as to why production planner 110 did not provide an expected or desired solution.

FIG. 6 illustrates a graphical user interface of an exemplary explanation tool window 600, according to an embodiment. According to embodiments, explanation tool 214 graphically identifies and indicates relationships between different values of automobile production solution 500. For example, explanation tool 214 may use a classification function to color-code, highlight or otherwise provide a graphical representation to indicate relationships between the different values of automobile production solution 500.

As an example only and not by way of limitation, the classification function may include color-coding, such that, a red color for the value of Production to Sales 518, which may indicate that the Production to Sales 518 result is under the demand 511, while a green color for the value of Production to Sales 518 may indicate that the result is the same as the demand 511. In addition, or as an alternative, the color-coding may also include, for example, a red color for the value of Stock Result 519, which may indicate that the result exceeds the capacity or falls below the lower bound, Stock Minimum 513, an orange color may represent that the result is the same as the upper bound, Stock Maximum 512 or the target capacity, and a blue color may represent that the result is the same as the lower bound, Stock Minimum 513. Although a particular classification function using colors and explanations have been shown and described, embodiments contemplate a classification function that provides any graphical representation and identification including any graphical elements, markings, colors or combination of elements, markings and colors, according to particular needs.

To further illustrate the classification function of explanation tool window 600, an example is now given. In the following example, and as illustrated in FIG. 6, the Production to Sales 518 for the sedan model with spoiler in the USA market for period 1 521, period 2 522, period 3 523 and period 4 524 graphically indicates that sales are satisfied since the Production to Sales 518 results [1000, 900, 1000, 850] are the same as the demand 511 for each of these first four time periods 521-524 [1000, 900, 1000, 850]. However, the Production to Sales 518 result in period 5 525 graphically indicates the Production to Sales 518 result [600] falls below the demand 511 [700] in period 5. Further, the Stock Result 519 values for all five time periods 521-525 [50, 50, 50, 50, 50] graphically indicates the results are exactly the same as the lower bound, Stock Min 513 [50, 50, 50, 50, 50]. For period 5 525, there are 600 vehicle sales, Production to Sales 518 with a stock minimum, Stock Result 519 of 50 vehicles. Therefore, 600 vehicles may be sold, and 50 vehicles kept for stock. However, because demand 511 is 700 vehicles, production planner 110 may allow to sell 650 vehicles and place no vehicles into stock, Stock Result 519.

FIG. 7 illustrates a graphical user interface of explanation tool window 600 having objectives display 720, according to an embodiment. According to an embodiment, selection of an objectives button 710 opens an objectives window 720 that overlays a portion of the automobile production solution. In addition, or as an alternative, the objectives window 720 may be triggered by a mouse over function, such that when a mouse hovers over objectives button 710, objectives window 720 overlays a portion of the automobile production solution. According to embodiments, the objectives window 720 indicates one or more objectives associated with the underlying production planning model. The objectives may include, for example, demand, stock maximum, stock minimum, plant or model production capacity and option production capacity. In addition, the objectives may be assigned values in an objectives sub-display to indicate the relative importance of each objective for solver 216, wherein the more important the constraint, the higher the number value associated with the objective. Although particular objectives, constraints and importance are shown and described, embodiments contemplate any objectives, constraints or level of importance associated with the underlying production planning model.

As an example only and not by way of limitation, the objective values shown in FIG. 7 may be 100 for demand, 1,000 for stock maximum and stock minimum, 10,000 for plant/model production capacity, and 100,000 for option production capacity. In this example, and based on these values, production planner 110 determines that the stock minimum having a value of 1,000 is more important than the demand having a value of 100. Since stock minimum is more important than demand, solver 216 may prefer to stock 50 vehicles instead of selling those 50 vehicles. In contrast, if the stock minimum value were set to 10, instead of 1,000, the demand objective would then be more important, and solver 216 would then alter the solution accordingly. In addition, or as an alternative, if the stock minimum is assigned a value of 10 in objectives window 720, and the demand value remains at 100, the objective demand will be more important than the stock minimum, and solver 216 will alter the solution to prioritize the demand objectives prior to stock minimum objectives. Although particular values for objectives have been shown and described, embodiments contemplate any number of values or objectives, according to particular needs.

FIG. 8 illustrates an additional view of the graphical user interface of exemplary explanation tool window 600, according to an embodiment. As can be seen and based on the changed objective values, discussed above in FIG. 7, the solution values for Production to Sales 518 in period 5 525 is now 650 and the Stock Result 519 in period 5 525 is now zero instead of 50, due to solver 216 reallocating vehicles based on the relative importance of the demand objective over the minimum stock objective.

Figure 9:
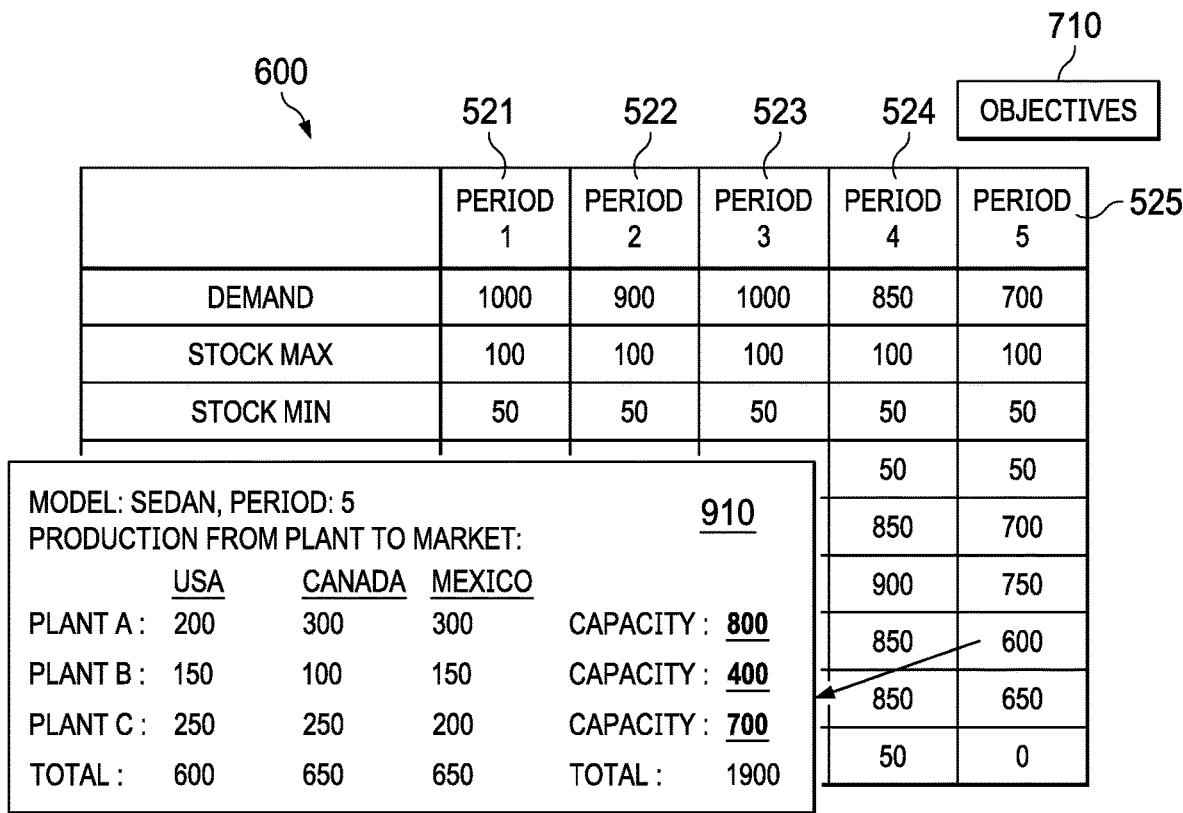
FIG. 9 illustrates a graphical user interface of the explanation tool window having a constraints display, according to an embodiment.

FIG. 9 illustrates a graphical user interface of explanation tool window 600 having constraints display 910, according to an embodiment. As another example and according to embodiments, production planner 110 may need to produce a certain amount of vehicles in a particular time period. However, solver 216 may generate a solution that provides less than the amount of vehicles needed in that time period. For example, production planner 110 may need to produce 700 sedan models with spoiler in the USA market at period 5 525. However, solver 216 produces only 600 vehicles at period 5 525 without explaining why 700 vehicles cannot be produced.

According to embodiments, explanation tool 214 displays constraints window 910 overlaying a portion of the production solution that explains the underlying cause of one or more solution results, which are linked to many constraints, plants, and markets. As shown in FIG. 9, constraints window 910 displays production constraints from different manufacturing plants to explain why the desired number of vehicles cannot be produced. Continuing with this example, the sedan model with spoiler is produced by three plants (plants A, B and C), and each plant produces vehicles for three markets (USA, Canada, and Mexico). Constraints window 910 displays production from each plant to each market for, for example, time period 5 525 and the capacity constraints for each plant. As discussed above, explanation tool 214 graphically identifies and indicates relationships between different values using a classification function to color-code, highlight or otherwise provide a graphical representation to indicate relationships between the different values. According to embodiments, explanation tool 214 uses a classification function to color-code the constraints. Continuing with this example, the capacity constraints may be colored orange, to indicate that the production is exactly the capacity. In this way, explanation tool 214 provides an explanation that 700 vehicles cannot be produced because all of the plant capacity is already accounted for.

According to embodiments, production planner 110 may integrate with explanation tool 214 to display capacity constraints in other markets or the plant production capacity table for that market. As an example only and not by way of limitation, in response to a user selection of the Canadian market results, explanation tool 214 may display Canadian market results, which would indicate why solver 216 generated a solution comprising a production result of 300 at Plant A. In addition, and in response to a user selection of a capacity constraints values, explanation tool 214 may display the plant production capacity table and allow for adjusting the capacity numbers.

Figure 10:
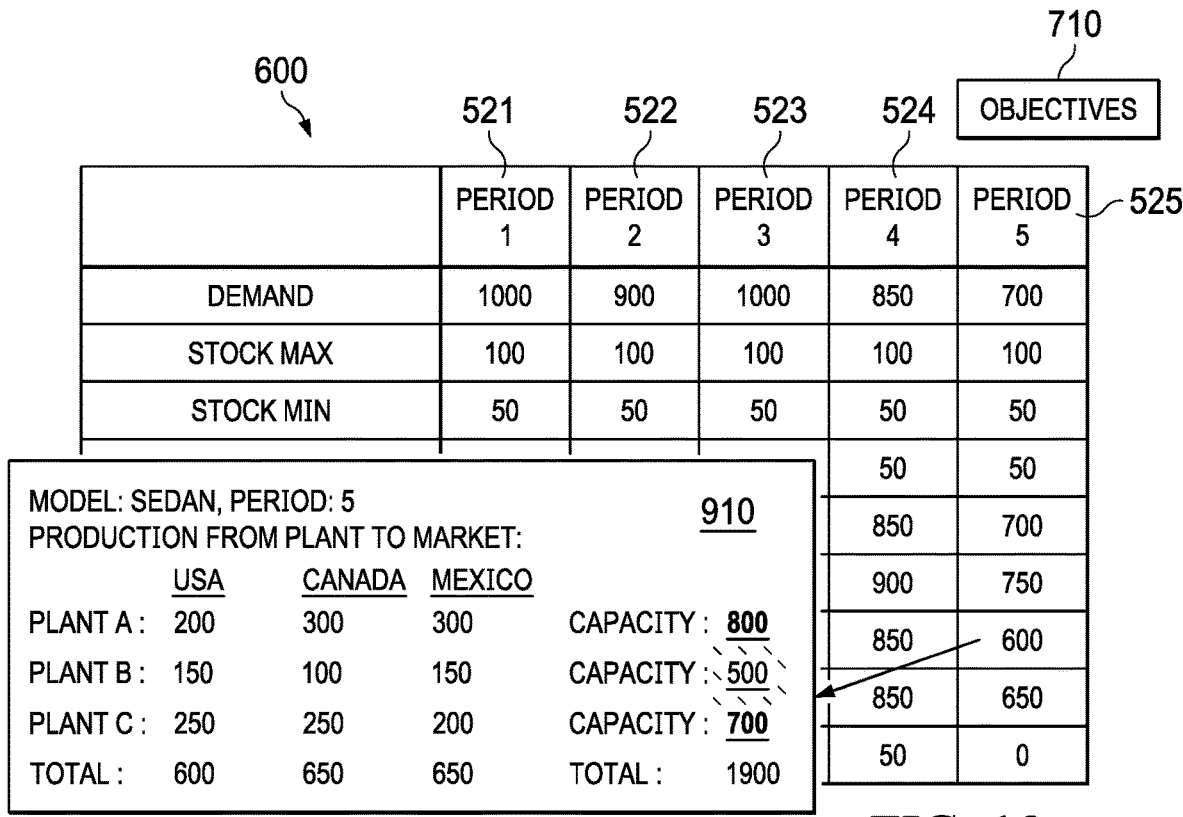
FIG. 10 illustrates a graphical user interface of the explanation tool window having a constraints display, according to an embodiment.

FIG. 10 illustrates a graphical user interface of explanation tool window 600 having constraints display 910, according to an embodiment. According to another embodiment, FIG. 10 provides an additional classification function showing, for example, that the capacity of 500 vehicles for Plant B in time period 5 525 is under capacity. In this example, it is not possible to produce over 600 vehicles in period 5 525 even if the production is strictly under the capacity of 500. This is visually communicated to production planner 110 through the displaying of the capacity of 500 vehicles for Plant B in time period 5 525, which in this example means the production is under capacity. The indication of the under capacity provides a way for explanation tool 214 to explain that Plant B's production capacities are not limiting the production to 600.

In addition, or as an alternative, and as explained above, option production capacity constraints differ from plant production capacity constraints. That is, an option production capacity constraint may be a constraint on particular options of vehicles, such as wheels, engines, or other components of the vehicle. In addition, production planner 110 may determine that the option production capacity constraints are lower-level constraints than the plant production constraints.

FIG. 11 illustrates a graphical user interface of explanation tool window 600 having option production capacity display 1110, according to an embodiment. As discussed above, explanation tool window 600 may display option production capacity results. For example, option production capacity display 1110, may display option capacity constraints for various options and current production values for each of those options for various vehicle models. The options for the sedan model at period 5 525 may comprise, for example, a V6 engine, a 4-cylinder engine, an automatic transmission, a moon roof, and an A24 model radio. Although particular options have been shown and described, embodiments contemplate any number of combination of options, according to particular needs.

As discussed above, explanation tool 214 graphically identifies and indicates relationships between different values using a classification function to color-code, highlight or otherwise provide a graphical representation to indicate relationships between the different values. According to embodiments, explanation tool 214 uses a classification function to color-code the option production capacity results. For example, the option production capacity results may be colored orange to indicate the production fully uses all of the option production capacity. In the illustrated example of FIG. 11, explanation tool 214 indicates that production of the V6 engine, the 4-cylinder engine, the automatic transmission, and the moon roof options are all at capacity by coloring the displayed numbers in orange or otherwise highlighting. In this example, for the moon roof, the production facility has exactly 325 capacity and the solution shows the facility produces exactly 325. In contrast, the radio option production capacity constraint indicates the production is under capacity.

According to embodiments, the number of option production capacity constraints may be large, because of the large amount of options available in a typical vehicle. This may make it difficult to determine which constraint is really limiting the production. However, according to embodiments, explanation tool 214 uses a filter function to filter the option production capacity results to show only constraints that limit production. For example, if the moon roof option limits production, production planner 110 may generate a production plan to produce more vehicles without a moon roof. To further illustrate solving option production capacity results using explanation tool 214, an example is now given. In the following example, an exemplary set of constraints for vehicle production for four predefined vehicles having the following exemplary options:

1—SUV, V6, MT, moonroof
2—SUV, V6, MT, no moonroof
3—SUV, 4 cyl., AT, moonroof, Radio A24
4—SUV, 4 cyl., AT, no moonroof, Radio A24, leather seats Having the following active constraints:
V6, 4 cyl., AT and moonroof As an example only and as shown above, predefined vehicle 1 is a SUV model with a V6 engine, manual transmission, and a moon roof. Predefined vehicle 2 is a SUV model with a V6 engine, manual transmission, and without a moon roof. Predefined vehicle 3 is a SUV model with a 4-cylinder engine, automatic transmission, a moon roof, and an A24 model radio. And, Predefined vehicle 4 is a SUV model with a 4-cylinder engine, automatic transmission, without a moon roof, with an A24 model radio, and leather seats.

Continuing with the above example, the active constraints include capacity constraints and option constraints. The active option constraints are the V6 engine, 4-cylinder engine, automatic transmission, and a moon roof. From there, explanation tool 214 may write the predefined vehicle as a function of these active constraints. As can be seen, dominated vehicles are eliminated from the list based on these constraints. According to embodiments, dominated vehicles are vehicles that, if produced, will violate the same constraints than other vehicles (the dominant), including one or more option constraints.

To further explain the elimination of vehicles, an example is now given. In the following example, there are four active constraints that may limit the production of the SUV model. To determine the constraints that truly only limit production of the SUV model, explanation tool 214 looks to the four predefined vehicles with the constrained options. In this example, the radio option production capacity is large enough so that the radio option is not a problem and is not limiting the production of the SUV model vehicle. Accordingly, explanation tool 214 may identify the predefined vehicles according to only the active constraints.

For example, a predefined vehicle may be represented by a set of 1's and 0's that indicate whether an option is assigned to that predefined vehicle, where a value of "1" indicates active option constraints associated with the predefined vehicle and a value of "0" indicates active option constraints that are not associated with the predefined vehicle:

1—(1,0,0,1)
2—(1,0,0,0)
3—(0,1,1,1)
4—(0,1,1,0)

Looking to predefined vehicle 1 in relation to the active constraints of a V6 or 4-cylinder engine, automatic transmission, and a moon roof, predefined vehicle 1 has a V6 engine and a moon roof but it is not a 4-cylinder and not an automatic transmission. Therefore, it is assigned the number values (1,0,0,1). The same is done for the other three predefined vehicles. Next, explanation tool 214 eliminates dominated vehicles from the list:

~~1—(1,0,0,1)~~
2—(1,0,0,0)
~~3—(0,1,1,1)~~
4—(0,1,1,0)

In this example, predefined vehicle 1 with values of (1,0,0,1) and predefined vehicle 3 with values of (0,1,1,1) are eliminated from the list because, predefined vehicle 1 has two options that are constrained and predefined vehicle 2 has only one option that is constrained. Explanation tool 214 determines that predefined vehicle 2 will not limit production as much since it only has the V6 option constraint. In contrast, predefined vehicle 1 has both the V6 engine and moon roof option constraints. The same process is used for predefined vehicles 3 and 4.

Looking to the list of eliminated vehicles, explanation tool 214 determines that two groups of constraints were shared between eliminated and non-eliminated vehicles:

{V6}
{4 cyl., AT}

Here, group 1 may share the V6 engine constraint and group 2 may share the 4-cylinder and automatic transmission constraints. Based on this, explanation tool 214 determines that the V6 engine constraint limits the SUV model production and the 4-cylinder engine and automatic transmission constraints also limit SUV model production.

FIG. 12 illustrates a graphical user interface of explanation tool window 600 having option production capacity display 1110, according to another embodiment. According to embodiments, explanation tool 214 may solve only the active constraint groups for a specific vehicle model to limit the number of constraints or constraint groups. In this way, explanation tool 214 displays only constraints that truly limit production. Production planner 110 may then determine whether to produce more vehicles with these constraints to reach the desired level of production in the particular time period.

As discussed above, based on the four predefined vehicles there were two groups of constraints that truly limit production: group 1 (V6 engine) and group 2 (4-cylinder engine and automatic transmission). Explanation tool 214 presents only the active constraints groups for the SUV model at period 5 525 and determines that if production planner 110 wants to produce more than the 600 vehicles provided by solver 216, production planner 110 may increase production of group 1 or group 2 active constraints.

According to this embodiment, the options are shared between the vehicle models. For example, the sedan model with a V6 engine has a high amount of constraints and production planner 110 may produce more SUV models if less sedan models with a V6 engine are produced. Explanation tool 214 displays results for any vehicle model. For example, explanation tool 214 may display sedan model results upon user selection of the sedan model heading. Additionally, explanation tool 214 may display the option capacity table upon user selection of the option production capacity results tables, which provides for production planner 110 to change specific capacities. In addition, or as an alternative, and as discussed above, the display may be an overlay of the explanation tool window 600. In other embodiments, the display may be triggered by a mouse over function, such that when a mouse hovers over explanation tool window 600, explanation tool 214 overlays a portion of explanation tool window 600.

FIG. 13 illustrates a graphical user interface of an exemplary automobile production solution 1300 having option capacity, according to embodiments. According to embodiments, production planner 110 displays automobile production solution 1300 in a table format, having rows 1310 and columns 1320, similar to exemplary automobile production solution 500. As discussed above, explanation tool 214 graphically identifies and indicates relationships between different values using a classification function to color-code, highlight or otherwise provide a graphical representation to indicate relationships between the different values. According to embodiments, explanation tool 214 uses the classification function to color-code the values. Continuing with this example, Production to Sales 1318 values may be color-coded green for the sedan to indicate that Production to Sales 1318 results are exactly equal to the demand 1311. Based on this visualization, production planner 110 may determine to produce more sedans, while the V6 engine option will be used by the SUV model.

In addition, or as an alternative, explanation tool 214 highlights particular productions results using the classification function. The classification takes into account the capacity constraints related to the specific result, including the model, market, and time period. As an example only and not by way of limitation, the classification function may include color-coding, such that a red color indicates the result is over the capacity or under the lower bound, an orange color indicates the result is exactly the upper or the target capacity, a blue color indicates the result is exactly the lower capacity, and a green color indicates the result is under the capacity or over the lower bound. Although particular colors or highlights have been shown and described, embodiments contemplate any number of colors or highlights, according to particular needs.

FIG. 14 illustrates a graphical user interface of exemplary automobile production solution 1300 having option capacity, according to other embodiments. As an example only and not by way of limitation, for the sedan vehicle model in the USA market, the Production Answer results may be colored green only in period 4 1324. This may indicate that the result is under the capacity or over the lower bound, Stock Minimum 1313. In other words, in this example production planner 110 may determine to produce more sedans at period 4 1324. Similarly, the Stock Result 1319 may be colored orange in period 4 1324 to indicate that the result is exactly the upper or the target capacity. In other words, the stock result is at the maximum stock, Stock Maximum 1312. Based on the classification function, explanation tool 214 indicates and displays an explanation for the results of a particular model and market on the graphical user interface. According, explanation tool 214 provides production planner 110 the ability to determine and produce more at period 4 1324 than have more stock, because there is more stock at period 4 1324, and production planner 110 may produce less at period 5 1325 while there is still stock at period 5 1325.

In other words, explanation tool 214 determines that at period 4 1324 for the sedan model, the Production Answer 1317 is under the capacity or over the lower bound. However, while there is production at period 4 1324 and enough capacity to produce more sedans at period 4 1324, the Stock Result 1319 at period 4 1324 shows the reason not to produce more. The indication that there is a Stock Maximum 1312 of 100 in the Stock Result 1319. Accordingly, explanation tool 214 indicates why production planner 110 should not produce at the capacity of the production plant and the option capacity.

Returning to the objectives of the production planning problem, as discussed above, the values of the objectives may demonstrate which objective is more important.

FIG. 15 illustrates a graphical user interface of explanation tool window 1300 having objectives display 1340, according to an embodiment. According to an embodiment, selection of an objectives button 1330 opens an objectives window 1340 that overlays a portion of the automobile production solution. In addition, or as an alternative, the objectives window 1340 may be triggered by a mouse over function, such that when a mouse hovers over objectives button 1330, objectives window 1340 overlays a portion of the automobile production solution. According to embodiments, and as discussed above, the one or more objectives indicated by the objectives window are associated with the underlying production planning model.

As an example only and not by way of limitation, the objective values shown in FIG. 15 may be 100 for demand, 1,000 for stock maximum, 10 for stock minimum, 10,000 for plant/model production capacity, and 100,000 for option production capacity. In this example, and based on these values, production planner 110 determines that the stock maximum objective having a value of 1,000 is more important than the demand having a value of 100. Here the demand objective is set at 100 while the stock maximum objective is set at 1,000. However, if the priority of the objectives is switched, then explanation tool 214 will instruct solver 216 to generate new results. In addition, or as an alternative, if the demand objective is set to 100 and the stock maximum objective is set at 10, then the stock maximum objective is less important than the demand objective. As discussed above, the priority of the demand objective and the stock maximum objective is switched, so that solver 216 prioritizes the demand objective prior to the stock maximum objective.

FIG. 16 illustrates an additional view of the graphical user interface of exemplary explanation tool window 1300 for a sedan model, according to an embodiment. By example and not by way of limitation, if the stock maximum objective is set to be less important, as discussed above, solver 216 may stock more than the quantity of stock needed. In this case, if 100 vehicles in stock is needed, solver 216 may produce a result with 100 less sedans at period 5 1325. Additionally, in period 4 1324, solver 216 results display that the production of Production Answer 1317 of 2,150 is exactly at capacity. Since production planner 110 has capacity here, solver 216 may show a result where production is 100 over the Stock Result 1319. The Stock Result 1319 of 200 at period 4 1324 indicates that the production is over capacity. Here, it is 100 over the Stock Maximum 1312. Therefore, in period 5 1325 solver 216 provides for a result for the Production Answer 1316 of 1,850 sedan vehicles.

FIG. 17 illustrates an additional view of the graphical user interface of exemplary explanation tool window 1300 for an SUV model, according to an embodiment. According to embodiments, solver 216 displays a result of 700 at period 5 1325, which matches the 700 that production planner 110 initially needed. A benefit of the current disclosure is this explanation dimension adds an understanding as to what is happening with each solution and what production planner 110 may do to resolve any results.

Although specific automotive industry examples have been given, explanation tool 214 may be applied to any sales and operation planning context, according to particular needs. For example, in the automotive industry there are supply and demand numbers only at the aggregate, which does not provide much information or explanation to production planner 110. Importantly, many of the critical details required to make supply chain planning decisions are missing. Explanation tool 214 provides production planner 110 the ability to quickly answer questions about, for example, whether it is possible to increase the capacity, what happens when capacity is increased, why demand cannot be increased, and the like.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method, comprising:
    modeling a production planning problem for two or more configurations of an automobile, the two or more configurations comprising one or more options, wherein the production planning problem is modelled as a linear program;
    representing the two or more configurations of the automobile as two or more predefined vehicles, the two or more predefined vehicles comprising one or more active option constraints associated with the one or more options, wherein each predefined vehicle of the two or more predefined vehicles is represented by a set of 1's or 0's indicating one or more associated active option constraints;

displaying on a graphical user interface, by a computer comprising a processor and a memory, an automobile production solution of the production planning problem; and in response to hovering a mouse over a portion of the graphical user interface, displaying an explanation tool window overlaid, at least in part, over the automobile production solution, wherein the explanation tool window comprises an explanation of the automobile production solution provided by the computer, wherein the explanation further comprises a plant production capacity table and further wherein one or more entries in the plant production capacity table are color-coded to classify one or more different relationships between one or more different values of the automobile production solution.

2. The computer-implemented method of claim 1, wherein the explanation tool window displays an option production capacity results table comprising at least one of the active option constraints.

3. The computer-implemented method of claim 2, further comprising:

eliminating one or more dominated vehicles from the two or more predefined vehicles, wherein the eliminated vehicles comprise at least one active option constraint shared with a non-eliminated vehicle.

4. The computer-implemented method of claim 3, further comprising:

grouping the eliminated and non-eliminated vehicles based, at least in part, on the at least one shared active option constraint; and calculating an option production capacity result of the at least one shared active option constraint, wherein the option production capacity results table comprises the option production capacity result of the at least one shared active option constraint.

5. The computer-implemented method of claim 4, further comprising:

displaying an option capacity table in response to selection of an element of the option production capacity results table, wherein the explanation tool window provides for editing a capacity of the option capacity table; and in response to the editing of the capacity, re-solving at least a portion of the production planning problem based, at least in part, on the edit of the capacity.

6. The computer-implemented method of claim 5, wherein the explanation tool displays the option production capacity results of the at least one shared active option constraint for a first automobile model and a second automobile model, and wherein the explanation tool provides for decreasing production of the first automobile model to provide an increase of the production of the second automobile model.

7. The computer-implemented method of claim 6, wherein the explanation tool window provides for color-coding one or more results of the solution of the production planning problem.

8. A system, comprising:

a computer comprising a processor and a memory, the computer configured to:

model a production planning problem for two or more configurations of an automobile, the two or more configurations comprising one or more options, wherein the production planning problem is modelled as a linear program;

represent the two or more configurations of the automobile as two or more predefined vehicles, the two or more predefined vehicles comprising one or more active option constraints associated with the one or more options, wherein each predefined vehicle of the two or more predefined vehicles is represented by a set of 1's or 0's indicating one or more associated active option constraints;

display on a graphical user interface, by a computer comprising a processor and a memory, an automobile production solution of the production planning problem; and in response to hovering a mouse over a portion of the graphical user interface, display an explanation tool window overlaid, at least in part, over the automobile production solution, wherein the explanation tool window comprises an explanation of the automobile production solution provided by the computer, wherein the explanation further comprises a plant production capacity table and further wherein one or more entries in the plant production capacity table are color-coded to classify one or more different relationships between one or more different values of the automobile production solution.

9. The system of claim 8, wherein the explanation tool window displays an option production capacity results table comprising at least one of the active option constraints.

10. The system of claim 9, wherein the computer is further configured to:

eliminate one or more dominated vehicles from the two or more predefined vehicles, wherein the eliminated vehicles comprise at least one active option constraint shared with a non-eliminated vehicle.

11. The system of claim 10, wherein the computer is further configured to:

group the eliminated and non-eliminated vehicles based, at least in part, on the at least one shared active option constraint; and calculate an option production capacity result of the at least one shared active option constraint, wherein the option production capacity results table comprises the option production capacity result of the at least one shared active option constraint.

12. The system of claim 11, wherein the computer is further configured to:

display an option capacity table in response to selection of an element of the option production capacity results table, wherein the explanation tool window provides for editing a capacity of the option capacity table; and in response to the editing of the capacity, re-solve at least a portion of the production planning problem based, at least in part, on the edit of the capacity.

13. The system of claim 12, wherein the explanation tool displays the option production capacity results of the at least one shared active option constraint for a first automobile model and a second automobile model, and wherein the explanation tool provides for decreasing production of the first automobile model to provide an increase of the production of the second automobile model.

14. The system of claim 13, wherein the explanation tool window provides for color-coding one or more results of the solution of the production planning problem.

15. A non-transitory computer-readable medium comprising software, the software when executed:

models a production planning problem for two or more configurations of an automobile, the two or more configurations comprising one or more options, wherein the production planning problem is modelled as a linear program;

represents the two or more configurations of the automobile as two or more predefined vehicles, the two or more predefined vehicles comprising one or more active option constraints associated with the one or more options, wherein each predefined vehicle of the two or more predefined vehicles is represented by a set of 1's or 0's indicating one or more associated active option constraints;

displays on a graphical user interface, by a computer comprising a processor and a memory, an automobile production solution of the production planning problem; and in response to hovering a mouse over a portion of the graphical user interface, displays an explanation tool window overlaid, at least in part, over the automobile production solution, wherein the explanation tool window comprises an explanation of the automobile production solution provided by the computer, wherein the explanation further comprises a plant production capacity table and further wherein one or more entries in the plant production capacity table are color-coded to classify one or more different relationships between one or more different values of the automobile production solution.

16. The non-transitory computer-readable medium of claim 15, wherein the explanation tool window displays an option production capacity results table comprising at least one of the active option constraints.

17. The non-transitory computer-readable medium of claim 16, wherein the software when executed further:

eliminates one or more dominated vehicles from the two or more predefined vehicles, wherein the eliminated vehicles comprise at least one active option constraint shared with a non-eliminated vehicle.

18. The non-transitory computer-readable medium of claim 17, wherein the software when executed further:

groups the eliminated and non-eliminated vehicles based, at least in part, on the at least one shared active option constraint; and calculates an option production capacity result of the at least one shared active option constraint, wherein the option production capacity results table comprises the option production capacity result of the at least one shared active option constraint.

19. The non-transitory computer-readable medium of claim 18, wherein the software when executed further:

displays an option capacity table in response to selection of an element of the option production capacity results table, wherein the explanation tool window provides for editing a capacity of the option capacity table; and in response to the editing of the capacity, re-solves at least a portion of the production planning problem based, at least in part, on the edit of the capacity.

20. The non-transitory computer-readable medium of claim 19, wherein the explanation tool displays the option production capacity results of the at least one shared active option constraint for a first automobile model and a second automobile model, and wherein the explanation tool provides for decreasing production of the first automobile model to provide an increase of the production of the second automobile model.

* * * * *